(12) United States Patent
Speller, III et al.

(10) Patent No.: US 11,368,513 B1
(45) Date of Patent: *Jun. 21, 2022

(54) SYSTEM AND FRAMEWORK FOR DEVELOPING AND PROVIDING MIDDLEWARE FOR WEB-BASED AND NATIVE APPLICATIONS

(71) Applicant: Modo Labs, Inc., Cambridge, MA (US)

(72) Inventors: Thomas Hughes Speller, III, Wakefield, MA (US); Brian Lawrence Patt, Cambridge, MA (US); Evan Arthur McCullough, Dedham, MA (US); Ryan Zhao Chan, Arlington, MA (US)

(73) Assignee: Modo Labs, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,764

(22) Filed: Dec. 27, 2021

Related U.S. Application Data

(63) Continuation of application No. 17/475,994, filed on Sep. 15, 2021, which is a continuation of application
(Continued)

(51) Int. Cl.
*H04L 29/06* (2006.01)
*H04L 67/02* (2022.01)
(Continued)

(52) U.S. Cl.
CPC ............ *H04L 67/02* (2013.01); *H04L 9/0825* (2013.01); *H04L 9/3213* (2013.01);
(Continued)

(58) Field of Classification Search
CPC ... H04L 67/02; H04L 9/0825; H04L 9/03213; H04L 9/3247; H04L 41/22; H04L 41/024; H04L 67/1095; H04L 67/2804
See application file for complete search history.

(56) References Cited

U.S. PATENT DOCUMENTS

| 8,225,271 | B2 | 7/2012 | Eldridge et al. |
| 8,230,390 | B2 | 7/2012 | Koster |

(Continued)

OTHER PUBLICATIONS

Cazoulat et al., "A template based production chain: using richmedia templates to assist users during content production", (Aug. 2007), 3 pages.
(Continued)

*Primary Examiner* — Tri M Tran
(74) *Attorney, Agent, or Firm* — Goodwin Procter LLP

(57) ABSTRACT

Systems and methods for providing a middleware application for user-interface-driven applications include receiving, at the middleware application, queries from different dynamic user interface modules associated with respective front-end applications. The front-end applications are authenticated using authentication data included in the query and verification data external to the middleware application. In response to each query, the middleware application receives data from different external data sources, each being a separate instance of the same back-end service. The data is used to generate objects declaring instances of user interface elements, which are sent by the middleware application to the requesting dynamic user interface module for rendering at the associated front-end application.

11 Claims, 12 Drawing Sheets

Related U.S. Application Data

No. 17/186,340, filed on Feb. 26, 2021, now Pat. No. 11,153,363.

(51) Int. Cl.
    *H04L 67/1095* (2022.01)
    *H04L 67/561* (2022.01)
    *H04L 9/08* (2006.01)
    *H04L 41/22* (2022.01)
    *H04L 9/32* (2006.01)
    *H04L 41/02* (2022.01)

(52) U.S. Cl.
    CPC .......... *H04L 9/3247* (2013.01); *H04L 41/024* (2013.01); *H04L 41/22* (2013.01); *H04L 67/1095* (2013.01); *H04L 67/2804* (2013.01)

(56) References Cited

U.S. PATENT DOCUMENTS

| | | |
|---|---|---|
| 8,402,555 B2 | 3/2013 | Grecia |
| 8,601,433 B2 | 12/2013 | Son et al. |
| 8,789,022 B2 | 7/2014 | Neogi |
| 8,887,132 B1 | 11/2014 | Hunter |
| 9,753,747 B2 | 9/2017 | Offenhartz et al. |
| 10,073,761 B2 | 9/2018 | Kidron et al. |
| 10,331,424 B1 * | 6/2019 | Speller, III ............ G06F 16/951 |
| 2002/0049788 A1 | 4/2002 | Lipkin et al. |
| 2004/0046789 A1 | 3/2004 | Inanoria |
| 2004/0268228 A1 | 12/2004 | Croney et al. |
| 2006/0123344 A1 | 6/2006 | Volkov et al. |
| 2007/0239749 A1 | 10/2007 | Farahbod |
| 2007/0277109 A1 | 11/2007 | Chen et al. |
| 2010/0037206 A1 | 2/2010 | Larimore et al. |
| 2011/0246961 A1 | 10/2011 | Tripathi |
| 2012/0026081 A1 | 2/2012 | Kompalli et al. |
| 2014/0068549 A1 | 3/2014 | Friedman et al. |
| 2014/0298419 A1 | 10/2014 | Boubez et al. |
| 2016/0062954 A1 | 3/2016 | Ruff |
| 2016/0349949 A1 | 12/2016 | Miller et al. |
| 2017/0185395 A1 | 6/2017 | Arians et al. |
| 2017/0324719 A1 | 11/2017 | Mason |
| 2018/0275881 A1 | 9/2018 | Ashraf et al. |

OTHER PUBLICATIONS

Himura et al., "Discovering configuration templates of virtualized tenant networks in multi-tenancy datacenters via graph-mining", (Jun. 2012), 8 pages.

Kohlschutter, C., "A densitometric analysis of web template content", (Apr. 2009), 2 pages.

Smarty3 Manual, New Digital Group, Inc., (Nov. 2010), 285 pages.

* cited by examiner

SYSTEM AND FRAMEWORK FOR DEVELOPING AND PROVIDING MIDDLEWARE FOR WEB-BASED AND NATIVE APPLICATIONS

CROSS REFERENCE TO RELATED APPLICATION

This application is a continuation of U.S. patent application Ser. No. 17/475,994, filed on Sep. 15, 2021, which is a continuation of U.S. patent application Ser. No. 17/186,340, filed on Feb. 26, 2021, which are hereby incorporated by reference in their entireties and for all purposes.

FIELD OF THE INVENTION

The present disclosure relates generally to software applications, and, more specifically, to systems and methods for deploying middleware applications as single instance services to connect multiple front-end applications with multiple back-end data source instances.

BACKGROUND

Middleware applications are commonly used to facilitate the transfer and management of data among software systems that cannot communicate directly, whether because such systems use different interfaces, different communication protocols, or other incompatible features. In certain existing user-interface-driven web applications, middleware may be used to integrate a front-end application with a remote data source. However, such middleware applications are tied to the combination of a particular front-end application and a remote data source, thereby requiring the deployment of multiple instances of the same middleware application in order to service different front-end applications, even when such applications retrieve data from the same type of data source. This creates significant challenges in maintaining resources and deploying changes in code consistently and efficiently and, further, results in deviations over time among otherwise initially identical integrations.

BRIEF SUMMARY

In one aspect, a computer-implemented method for providing a middleware application for user-interface-driven applications comprises the steps of receiving, at a middleware application, a first query from a first dynamic user interface module associated with a first front-end application; in response to the first query: receiving, over a network by the middleware application, first data from a first external data source; generating, based on the first data, a set of one or more objects declaring instances of first user interface elements; and sending, by the middleware application to the first dynamic user interface module, the set of one or more objects declaring instances of first user interface elements, wherein the first dynamic user interface module is configured to instruct the first front-end application how to render the first user interface elements; and receiving, at the middleware application, a second query from a second dynamic user interface module associated with a second front-end application; and in response to the second query: receiving, over a network by the middleware application, second data from a second external data source, wherein the first external data source and the second external data source comprise separate instances of a same back-end service; generating, based on the second data, a set of one or more objects declaring instances of second user interface elements; and sending, by the middleware application to the second dynamic user interface module, the set of one or more objects declaring instances of second user interface elements, wherein the second dynamic user interface module is configured to instruct the second front-end application how to render the second user interface elements. Other aspects of the foregoing include corresponding computer systems and computer-executable instructions stored on non-transitory storage media.

Various implementations of the foregoing aspects can include one or more of the following features. The middleware application can communicate with each dynamic user interface module via a web service. The first query can comprise first authentication data and a first unique identifier, each associated with the first front-end application, and, in response to the first query: the middleware application can receive from an authentication resource external to the middleware application, based on the first unique identifier, first verification data; and the first front-end application can be authenticated based on the first authentication data and the first verification data. The first authentication data can comprise a JavaScript Object Notation Web Token comprising a signature formed using a private key of the first front-end application, and the first verification data can comprise a public key for verifying the signature. The first authentication data can comprise metadata relating to a user of the first front-end application, context and/or a device on which the first front-end application executes, and generating the set of one or more objects declaring instances of first user interface elements can further be based on the metadata. The first query can comprise a first unique identifier and a first configuration identifier, each associated with the first front-end application, and, in response to the first query: the middleware application can receive from a configuration resource external to the middleware application, based on the first configuration identifier, first configuration data corresponding to the first front-end application, wherein the first configuration data comprises information necessary for the middleware application to communicate with a first external data source; and a connection can be established over a network between the middleware application and the first external data source using the first configuration data. The first configuration data can further comprise information for configuring a user interface of the first front-end application. A schema can be provided defining naming, data types and structure for configuration data stored at the configuration resource, wherein the first configuration data conforms to the schema.

In another aspect, a computer-implemented method for providing a middleware application for user-interface-driven applications comprises the steps of receiving, at a middleware application, a first query associated with a first front-end application, wherein the first query comprises first authentication data, a first unique identifier, and a first configuration identifier, each associated with the first front-end application; in response to the first query: receiving at the middleware application from an authentication resource external to the middleware application, based on the first unique identifier, first verification data; authenticating the first front-end application based on the first authentication data and the first verification data; receiving at the middleware application from a configuration resource external to the middleware application, based on the first configuration identifier, first configuration data corresponding to the first front-end application, wherein the first configuration data comprises information necessary for the middleware application to communicate with a first external data source; establishing over a network a connection between the middleware application and a first external data source using the first configuration data; and receiving, by the middleware application, first data from the first external data source; receiving, at the middleware application, a second query associated with a second front-end application, wherein the second query comprises second authentication data, a second unique identifier and a second configuration identifier, each associated with the second front-end application; and in response to the second query: receiving at the middleware application from the authentication resource, based on the second unique identifier, second verification data; authenticating the second front-end application based on the second authentication data and the second verification data; receiving at the middleware application from the configuration resource, based on the second configuration identifier, second configuration data corresponding to the second front-end application, wherein the second configuration data comprises information necessary for the middleware application to communicate with the second external data source; establishing over a network a connection between the middleware application and a second external data source using the second configuration data, wherein the first external data source and the second external data source comprise separate instances of a same back-end service; and receiving, by the middleware application, second data from the second external data source. Other aspects of the foregoing include corresponding computer systems and computer-executable instructions stored on non-transitory storage media.

In another aspect, a computer-implemented method for providing a middleware application for user-interface-driven applications comprises the steps of receiving at a middleware application, a plurality of queries from a plurality of different front-end applications; and in response to each query: authenticating one of the front-end applications associated with the query using authentication data included in the query and verification data external to the middleware application; establishing a connection between the middleware application and an external data source using configuration data that conforms to a schema, wherein the configuration data is associated with the front-end application and is received from a configuration resource external to the middleware application; receiving, over a network by the middleware application, data from the external data source; and sending, by the middleware application to the front-end application, information based on the data. Other aspects of the foregoing include corresponding computer systems and computer-executable instructions stored on non-transitory storage media.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

DETAILED DESCRIPTION

Figure 1:
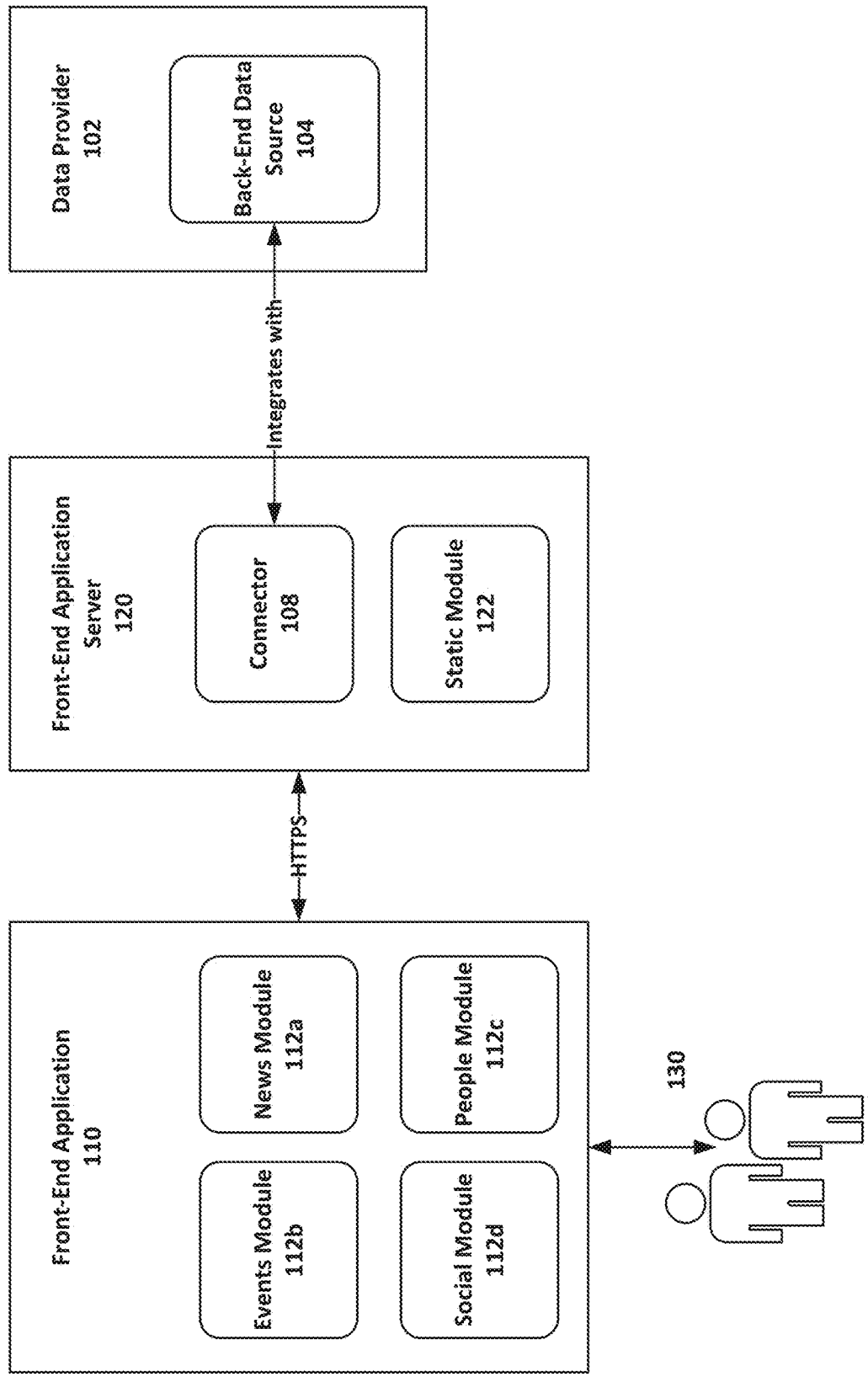
FIG. 1 depicts a high-level architecture of a traditional system for providing user interface modules.

Described herein are methods and supporting systems for enabling the development of custom user interfaces using web services that conform to a specification. FIG. 1 depicts a traditional system in which the back-end data source 104 of a data provider 102 integrates with predefined user interface modules 112*a*-112*d* within a front-end application 110 used by users 130, such as a web browser or a native mobile application. In one implementation, the user interface modules 112*a*-112*d* include modules made available through the mobile interface development platform provided by MODO LABS, INC. of Cambridge, Mass. Although four user interface modules 112*a*-112*d* are shown for convenience, any number of user interface modules is contemplated. The integration is accomplished using a connector software component (connector) 108 within a front-end application server 120, where the connector 108 directly integrates with and retrieves data from the back-end data source 104 (e.g., over an HTTPS connection, LDAP connection, or other communication protocol) and maps the data to elements in the user interface modules 112*a*-112*d*. For example, back-end data source 104 can include a database of student information, and data items such as student name, address, and age can be retrieved from the back-end data source 104 by connector 108 and mapped into a user interface module that displays the student information, such as People Module 112*c*. The user interface modules 112*a*-112*d* in the front-end application 110 receive from the front-end application server 120 (e.g., over an HTTPS connection) the mapped data retrieved by such front-end application server 120 from the back-end data source 104. In order to ensure that the data provider 102 can properly integrate with the user interface modules 112*a*-112*d* in the front-end application 110, the developer of the connector 108 must have intimate knowledge of how the modules 112a-112d are constructed. As such, it is necessary for the provider of the modules 112a-112d also to be responsible for developing the connector 108, which places additional burdens on the module provider and limits the data provider's ability to independently change the use of user interface modules within the application front-end application 110.

Dynamic User Interface Modules

Figure 2:
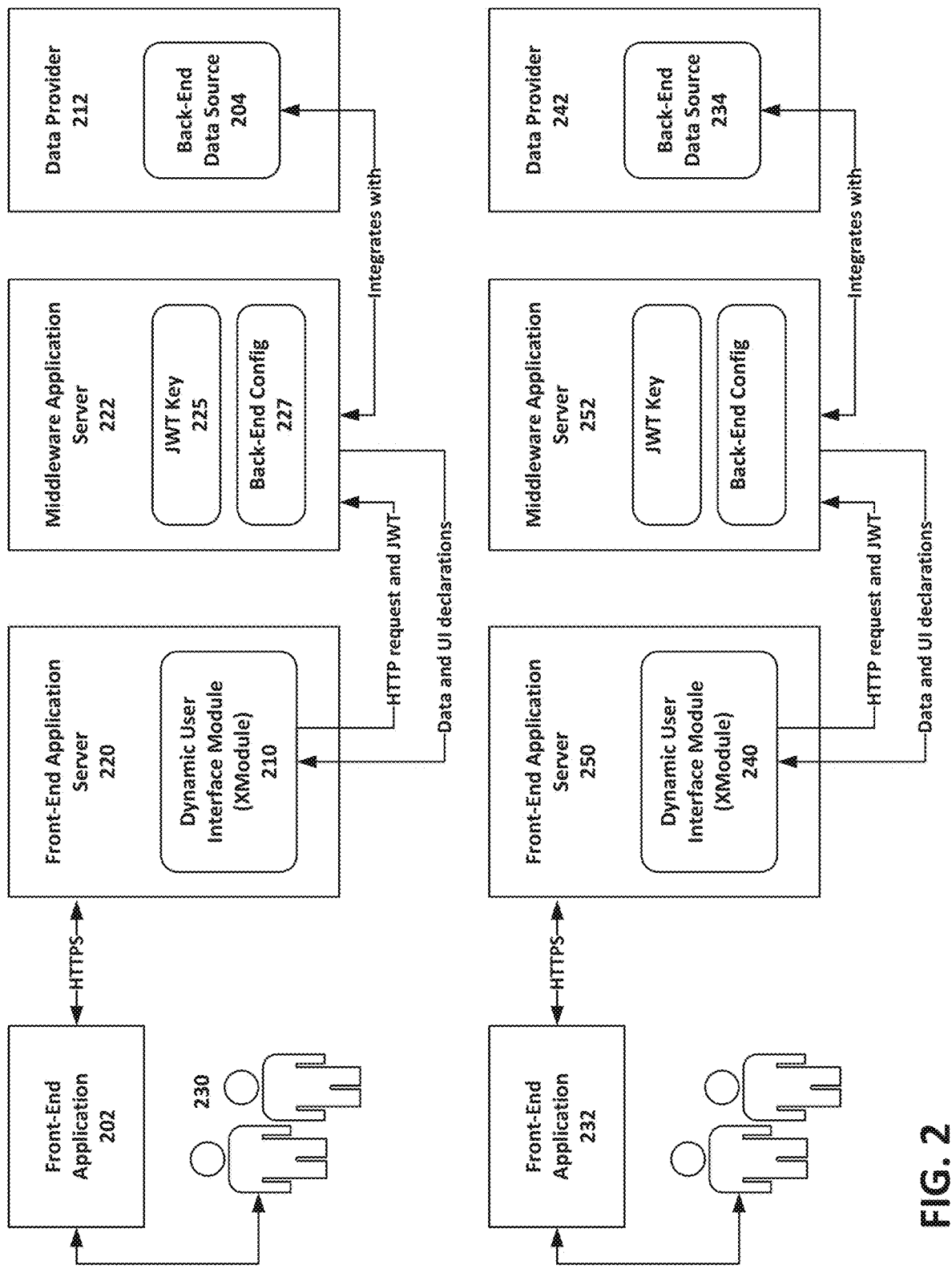
FIG. 2 depicts a high-level architecture of a system for providing dynamic user interface modules via separate middleware applications.

FIG. 2 depicts an improvement to the system depicted in FIG. 1, in which the connector 108 of FIG. 1 is separated into a web-service-based middleware application responsible for providing user interface declarations that instruct the dynamic user interface of a front-end application on how to render data. As shown, a custom-developed connector between the back-end data source 204 of the data provider 212 and the front-end application 202 is no longer required. Instead, a middleware application server 222 executes a middleware application, and three new components together enable the configuration and data population of predefined user interface modules within front-end application 202, without the need for a connector that retrieves data and maps the data to user interface elements. First, a specification is provided that documents the types of user interface elements, as embodied in modules, that are available, and the format for declaring each element and the individual items of data that it supports. For example, a "list" user interface element can be defined to include a collection of individual list elements. Next, within the middleware application on middleware application server 222, a web service (e.g., an application programming interface ("API") over a web protocol, such as HTTP or HTTPS) that conforms to the specification is connected to the back-end data source 204 of the data provider 212. More specifically, the web service is able to retrieve data from the back-end data source 204 and communicate the data in a format defined by the specification. In one implementation, the web service is a JavaScript Object Notation ("JSON")-based web service, which communicates data from the back-end data source 204 as JSON objects. The middleware application server 222 can also store or have access to a back-end configuration 227 that instructs the middleware application server 222 how to communicate with the back-end data source 204.

In a front-end application server 220, a dynamic user interface module, referred to here as an "XModule" 210, automatically renders data and user interface declarations received from the web service that conform to the specification. The XModule 210 can query the web service executing on the middleware application server 222 for data using any suitable technique. For example, the XModule 210 can make HTTP-based requests (e.g., GET or POST) to the web service, which returns an HTTP response. A request from the XModule 210 can include a JSON Web Token ("JWT") for authentication purposes, and the middleware application server 222 can have a corresponding JWT key 225 to verify the JWT passed by the XModule 210. As previously mentioned, the XModule 210 can render data received from the web service 202. In particular, the XModule 210 can render a user interface that corresponds to user interface elements defined in the received data. Information associated with the user interface can be communicated (e.g., using HTTP-based communication) to front-end application 202.

In some implementations, there are one or more web services that communicate with one or more XModules. For example, a second web service can retrieve data from a second back-end data source and communicate the data in a form meeting the specification to XModule 210 and/or other XModule instances. In other implementations, there are one or more additional middleware application servers, each configured to integrate one front-end application with one or more back-end data sources. For example, as depicted in FIG. 2, a second front-end application 232 is able to display a dynamic user interface by virtue of communication with a second front-end application server 250 having a second XModule 240. This XModule 240 communicates with a second web service provided by a second middleware application server 252, which is integrated with a second back-end data source 234 in data provider 242. In some implementations, the back-end data sources 204 and 234 are the same type, whereas, in other implementations, the back-end data sources 204 and 234 are different types.

Figure 3:
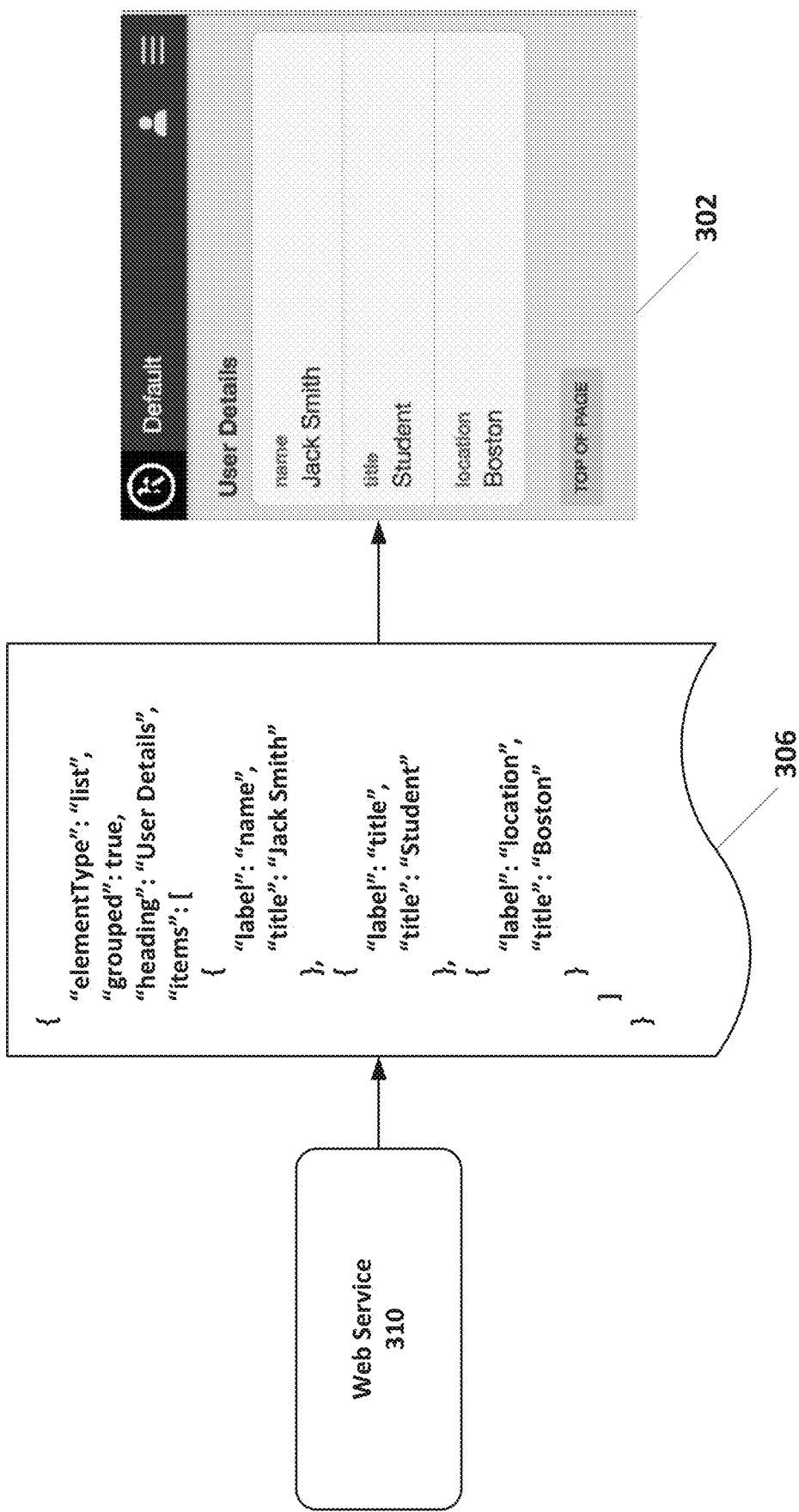
FIG. 3 depicts an example dynamic user interface module rendering a user interface element from a web service response.

Advantageously, although generally referred to as a module herein, an XModule can be an individual module and render one or more user interface elements within a separate application or, in other instances, the XModule itself can be an application that provides one or more user interface elements. An XModule can also be an XComponent, as further described below. In one implementation, the XModule provider makes an underlying platform available that allows the XModule to execute as either a standalone application or as a module within another application. Such a platform can include, for example, the mobile interface development platform provided by MODO LABS, INC. of Cambridge, Mass. Implementations of) (Modules are described further in U.S. Pat. No. 10,331,424, issued on Jun. 25, 2019, and entitled "User Interface Development Through Web Service Data Declarations," the entirety of which is incorporated by reference herein FIG. 3 depicts one example of an XModule 302 rendering JSON data 306 provided by a web service 310 upon the XModule 302 querying the web service 310. Here, the) (Module 302 is a user interface module that displays a user profile, with individual data items in the profile being shown in a list format. The JSON data 306 defines the "list" user interface element type, which indicates that the corresponding XModule 302 should render a predefined list user interface element. In addition to setting the "grouped" and "heading" properties, the JSON data 306 for the list includes an array of list "items," with each item having a declared "label" data value and corresponding "title" value. In some implementations, the visual properties (e.g., color, layout, font, etc.) of the XModule 302 are configurable by the web service 310 through particular declarations included in the JSON data 306. In further implementations, the visual properties of the XModule 302 are configured to adapt to the particular platform on which the XModule 302 is displayed. For example, the XModule 302 can be rendered differently depending on whether a user is viewing an application or webpage using the) (Module 302 on a smartphone vs. a tablet, or an Android-based device vs. an iOS-based device, for example. Techniques for adapting user interface components to different platforms and devices are described in U.S. Pat. No. 9,015,657, issued on Apr. 21, 2015, and entitled "Systems and Methods for Developing and Delivering Platform Adaptive Web and Native Application Content," the entirety of which is incorporated by reference herein.

Figure 4:
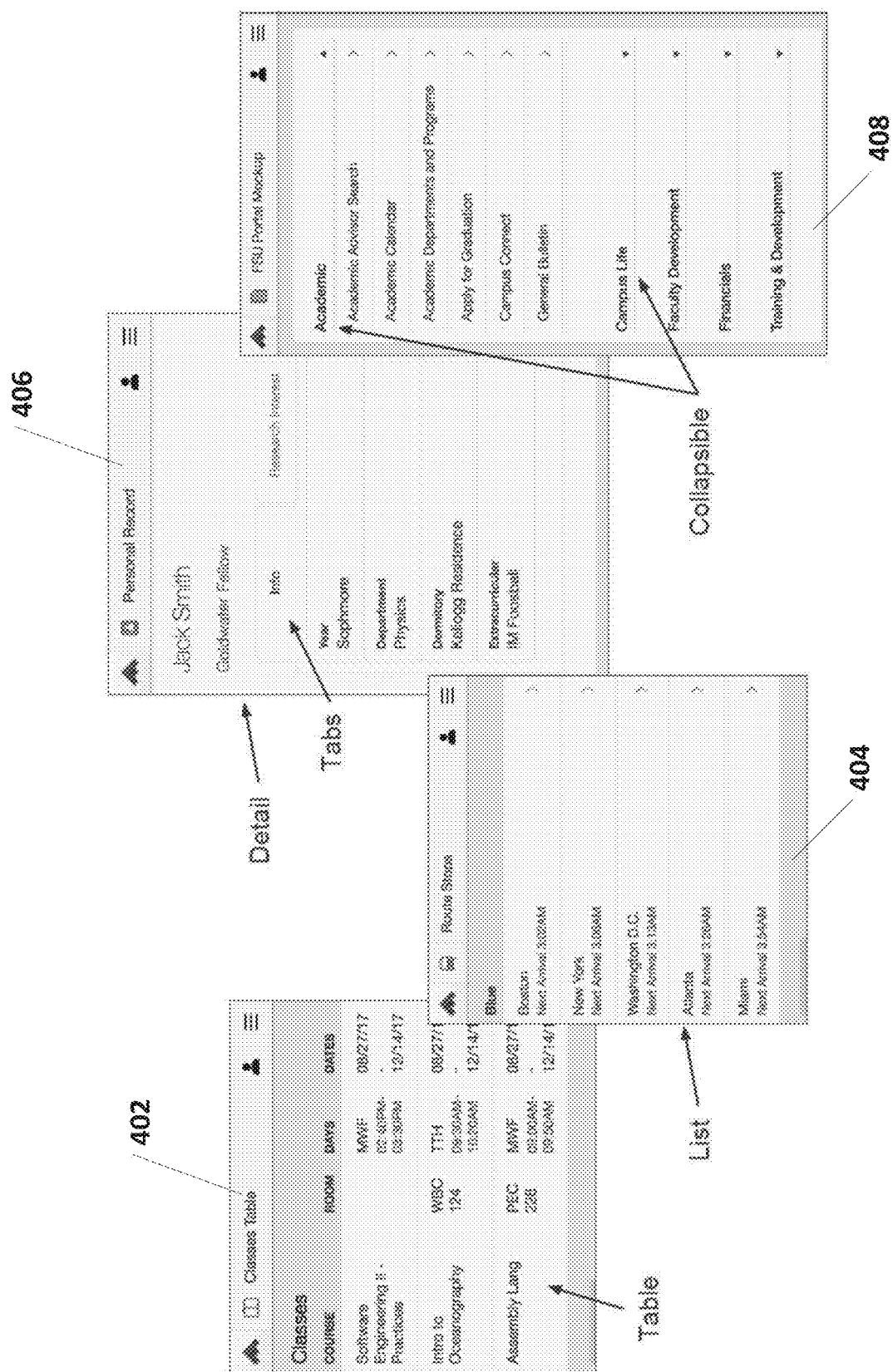
FIG. 4 depicts various examples of dynamic user interface modules rendering different user interface elements.

FIG. 4 illustrates additional elements of XModule user interface modules.) (Module 402 depicts a class schedule using a table user interface element. XModule 404 depicts a transit schedule using a list user interface element. XModule 406 shows a personal record for a student with tab user interface elements to allow a user to alternate between different sets of information (i.e., student info and research interests). XModule 408 depicts a university portal page with collapsible list user interface elements. One of skill in the art will appreciate that various user interface elements can be included in an XModule, including but not limited to buttons, text areas, multicolumn and multirow formats, images, videos, formatted text, entry fields, sliders, scroll bars, radio buttons, checkboxes, drop-down boxes, forms, calendars, maps, links, portlets, social media feeds, share buttons, and the like.

Figure 5:
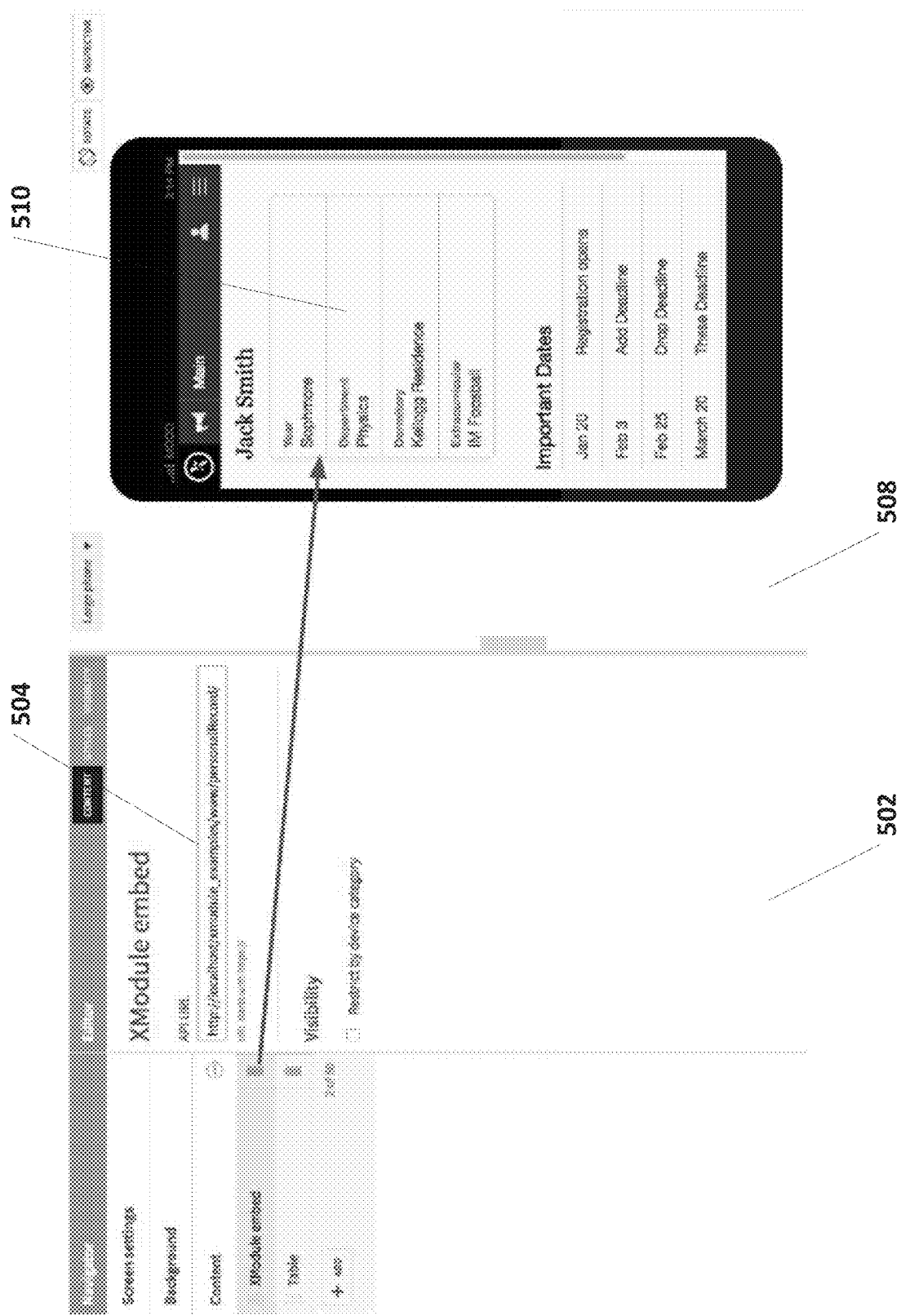
FIG. 5 depicts an example interface screen for configuring a web service for a dynamic user interface module.

FIG. 5 depicts an example graphical user interface for embedding an XModule (more specifically, an XComponent, as further described below) into an application. The editor pane 502 includes an API uniform resource locator ("URL") field 504 where a user can specify the hosting location of the web service that will provide data to the XComponent. The preview pane 508 includes a preview 510 of the XComponent as it will appear on a particular device or platform, such as a smartphone with a large screen, as depicted. As shown in FIG. 5, the preview 510 of the XComponent includes a list user interface element composed of data items (year, department, dormitory, and extracurricular activities) associated with a particular student. These data items can be automatically populated in the preview 510 using a response (e.g., JSON response) obtained from querying the web service specified in the API URL field 504.

Implementations of the web service within a middleware application server will now be described in further detail. The web service can be an API provided over any suitable network protocol, such as Hypertext Transfer Protocol ("HTTP") or HTTP Secure ("HTTPS"). In one implementation, the web service is an HTTP-based web service that responds to GET and POST requests from an XModule. Unless an error occurs or an invalid request is received, the web service responds in JSON, including a declaration of which user interface elements to display. The response is returned with an HTTP status code of 200 (OK), indicating that the response is acceptable to be rendered by the requesting XModule. An example request to https://api.example.com is as follows:
 Request:
 GET/HTTP/1.1
 Host: api.example.com
 Authorization: Bearer <token>
An example response, without content, is as follows:
 Response:
 HTTP/1.1 200 OK
 Content-Type: application/json
 Content-Length: 71
 {
  "metadata":
   "version": "1"
  },
  "content": [
  ]
 }

The web service response includes two root elements: metadata and content. The metadata element is an object container for metadata, such as the version of the XModule specification that the web service is using. The content element is an array container for user interface elements. Each user interface element is declared as an individual item in the array. Several examples of user interface elements that can be declared by the web service within the JSON content element will now be described in the following tables and accompanying text, although it is to be appreciated that various user interface element types are contemplated. An) (Module receiving declared user interface elements through the web service can render the elements in accordance with their declared fields and associated properties.

A "list" user interface element is a list of items to be displayed.

| Field | Type | Description |
| --- | --- | --- |
| elementType | string | For a list element this field is "list". |
| heading | string | Displays a heading above the list. |
| grouped | boolean | A display style that can be used when strong visual separation between this list and other major elements of the screen is required; defaults to false. |
| items | array | A container of item objects (see below). |

The items array in a list element can include objects of type "item", which are elements contained within the list.

| Field | Type | Description |
| --- | --- | --- |
| title | string | The title of the item. |
| label | string | A label which appears above the item's title. |
| description | string | A subtitle that is displayed between the item's title and content. |
| link | object | Setting this field turns the item into a link that can be interacted with. |
| thumbnail | object | An image displayed to the left of the item's text fields. |

As shown in the above table, an item object can include a "thumbnail" object, which is an image displayed next to the item's text fields.

| Field | Type | Description |
| --- | --- | --- |
| url | string | The URL for the image. |
| maxWidth | number | An integer indicating the maximum width of the image in pixels. |
| maxHeight | number | An integer indicating the maximum height of the image in pixels. |
| crop | boolean | A false value maintains the image's original aspect ratio; a true value will scale the image to meet the max setting for at least one dimension (width or height) and then crop the other dimension as needed; defaults to false. |
| Alt | string | Alternate text for accessibility purposes. |

Example JSON produced by a web service for a list element is as follows:
 {
 "elementType": "list",
 "grouped": true,
 "heading": "Example heading",
 "items": [
  {
   "label": "Example label",
   "title": "Example title",
   "description": "Example description"
  },
  {
   "title": "Example title with link",
   "link": {
    "relativePath": "?page=example link",
    "accessoryIcon": "plus"
   },
   "thumbnail": {
    "url": "http://static.modolabs.com/services/modo.png",
    "maxWidth": 43,

```
            "maxHeight": 43,
            "crop": true,
            "alt": "Modo Labs"
        }
    }
]
}
```

An "image" user interface element enables input of an image from an external URL.

| Field | Type | Description |
| --- | --- | --- |
| elementType | string | For an image element this field is "image". |
| url | string | A URL to a hosted image. |
| alt | string | Alternate text for accessibility purposes. |
| scaleToFull | boolean | If true, will scale the image to the full width of the enclosing element; defaults to false. |

Example JSON produced by a web service for an image element is as follows:
```
{
"elementType": "image",
"url":
"https://upload.wikimedia.org/wikipedia/commons/a/a5/Example_svg.svg"
}
```

A "linkButton" user interface element is a button intended for linking the user to another page. Buttons are displayed in a "buttonContainer" element.

| Field | Type | Description |
| --- | --- | --- |
| elementType | string | For a linkButton element this field is "linkButton". |
| title | string | The text displayed within the linkButton. |
| link | object | Link object (see below). |
| disabled | boolean | When set to true, the linkButton element is grayed out and cannot be interacted with (e.g., untappable). |
| accessoryIconPosition | string | If the "link" has an "accessoryIcon" set, this field controls the relative positioning of the icon; allowed values are "left" and "right"; defaults to "left". |
| actionType | string | Sets the style of the button to indicate what kind of action it performs; allowed values are "constructive", "destructive", and "emphasized". |

Example JSON produced by a web service for a linkButton element nested within a buttonContainer element is as follows:
```
{
"elementType": "buttonContainer",
"buttons": [
    {
        "elementType": "linkButton",
        "title": "Button Title",
        "link":
            "external": "http://www.example.com",
            "accessoryIcon": "drilldown"
        },
        "accessoryIconPosition": "right"
    }
]
}
```

A "buttonContainer" element is used as a wrapper for button elements. Buttons that are wrapped inside the same buttonContainer can be displayed inline.

| Field | Type | Description |
| --- | --- | --- |
| elementType | string | For a buttonContainer element this field is "buttonContainer". |
| buttons | array | An container for one or more buttons. |

Example JSON produced by a web service for a buttonContainer element is as follows:
```
{
"elementType": "buttonContainer",
"buttons": [
    {
        "elementType": "linkButton",
        "title": "Constructive",
        "link": {
            "external": "http://www.example.com"
        },
        "actionType": "constructive"
    },
    {
        "elementType": "linkButton",
        "title": "Destructive",
        "link":
            "external": "http://www.example.com"
        },
        "actionType": "destructive"
    },
    {
        "elementType": "linkButton"
        , "title": "Emphasized",
        "link": }
            "external": "http://www.example.com"
        },
        "actionType": "emphasized"
    }
]
}
```

A "portlet" element is a type of container that can be used to distinguish content as being from a different source than other content in the page.

| Field | Type | Description |
| --- | --- | --- |
| elementType | string | For a portlet element this field is "portlet". |
| navbarTitle | string | The title of the portlet. |
| navbarIcon | string | An icon specified from a set of icons configured in for a particular theme. |
| navbarLink | object | Link object (see below). |
| content | array | A container for other element types that can be displayed within the portlet's content area. |
| height | string | The height can be one of the following values: "auto", "small", "medium", "large", "xlarge". The default value is "auto". |

Example JSON produced by a web service for a portlet element is as follows:
```
{
"elementType": "portlet",
"navbarTitle": "Portlet Title",
"navbarIcon": "fullweb", "content": [ ]
}
```

A "link" object indicates the type of page to which a user will be taken when they interact with a user interface element's link. The link type is set as a field within the link object, and can include one of the following.

| Field | Type | Description |
| --- | --- | --- |
| relativePath | string | A link type used for linking to a page in the same XModule instance. Example JSON: "relativePath": "?page=example_link". |
| external | string | A link type that accepts a URL to an external web page. Example JSON: "external": "https://www.wikipedia.org". |
| module | object | A link type used for linking to a page in another user interface module. |
| xmodule | object | A link type used for linking to a page in another XModule instance. |

The "module" link type is an object that accepts the below fields. This link type can be used for linking to any other module that has been configured within the same application.

| Field | Type | Description |
| --- | --- | --- |
| id | string | The id (or path) of the module to link to. |
| page | string | A specific page within the module; if not specified this will default to the module's index page. |
| queryParameters | object | An object containing key/value pairs that represent parameters in the link's query string. |

Example JSON produced by a web service for a link element of type "module" is as follows:
"link": {
  "module": {
    "id": "map",
    "page": "search",
    "queryParameters": {
      "search": "Search",
      "filter": "theater"
    }
  }
}

The "xmodule" link type is used to link to other XModule instances. It includes a relativePath field that is conceptually the same as the relativePath link type.

| Field | Type | Description |
| --- | --- | --- |
| id | string | The id (or path) of the XModule to link to. |
| relativePath | string | Used for deep linking to a page in another XModule instance; if not specified this will default to the XModule web service's base URL. |

Example JSON produced by a web service for a link element of type "xmodule" is as follows:
"link": {
  "xmodule": {
    "id": "another_xmodule",
    "relativePath": "/detail"
  }
}

A "form" element contains other form user interface elements, such as radio buttons, text fields, checkboxes, submit buttons and other elements used in a form.

| Field | Type | Description |
| --- | --- | --- |
| elementType | string | For a form element this field is "form". |
| postRelativePath | string | Indicates the URL to which the XModule should post form inputs. |
| heading | string | A heading that is displayed above the form items. |
| items | array | A container for other form elements; may contain non-form user interface elements as well. |

Example JSON produced by a web service for an empty "form" element is as follows:
{
  "metadata": {
    "version": "1"
  },
  "content": [
    {
      "elementType": "form",
      "postRelativePath": "form_receipt/",
      "items": [
      ]
    }
  ]
}

A "formButton" element is a button that performs a form action. As noted above, button elements are wrapped in buttonContainers.

| Field | Type | Description |
| --- | --- | --- |
| elementType | string | For a form button element this field is "formButton". |
| title | string | The text displayed within the button. |
| name | string | The name of the form button to be passed as part of a form submission. |
| buttonType | string | Two possible values: "submit" or "reset"; the "submit" type will result in a form submission; the "reset" type will reset any form inputs to their initial values; defaults to "submit". |
| accessoryIcon | string | An icon that indicates the action that the button performs; the icon can be one of the following values: "drilldown", "phone", "sms", "comment", "email", "email_open", "reply", "calendar", "people", "map", "secure", "unlock", "external", "attachment", "download", "upload", "camera", "print", "favorite", "bookmark", "share", "rotate", "plus", "minus", "button_add", "button_remove", "flag", "delete", "reset", "reload", "like", "unlike", "checkbox", "checkbox_on"; defaults to null. |

| Field | Type | Description |
|---|---|---|
| accessoryIconPosition | string | If an "accessoryIcon" is set, this field controls the relative positioning of the icon; allowed values are "left" and "right"; defaults to "left". |
| actionType | string | Sets the style of the button to indicate what kind of action it performs; allowed values are "constructive", "destructive", and "emphasized". |

Form elements can include various input items, such as text fields, password fields, radio buttons, checkboxes, drop-down lists, and other user interface components. As one example, the fields for a text input are as follows.

| Field | Type | Description |
|---|---|---|
| elementType | string | For an input type element, this field is "input". |
| inputType | string | For a text input this field is "text". |
| name | string | The name of the input field to be passed in a form submission. |
| label | string | A label to indicate what the user should input. |
| description | string | A description for providing further information that appears beneath the input field. |
| value | string | When set will pre-populate the input field with the value; defaults to null. |
| placeholder | string | Used to display a short hint within the input field; defaults to null. |
| required | boolean | Indicates whether the user must enter a value to the input field in order to submit the form; defaults to false. |

Example JSON produced by a web service for a "form" element with text inputs and a submit form button is as follows:

```
{
"elementType": "form",
"postRelativePath": "form_receipt/",
"items": [
  {
    "elementType": "input",
    "inputType": "text",
    "name": "text_input_1",
    "label": "Text Label",
    "description": "Text Description",
    "required": true,
    "placeholder": "Placeholder Text"
  },
  {
    "elementType": "input",
    "inputType": "text",
    "name": "text_input_2",
    "label": "Text Label",
    "value": "Default Value"
  },
  {
    "elementType": "buttonContainer",
    "buttons": [
      {
        "elementType": "formButton",
        "title": "Submit",
        "buttonType": "submit"
      }
    ]
  }
]
}
```

In one implementation, the base URL of a web service acts as the index page of the XModule that is configured to query the web service URL. To create multiple pages within a single XModule, the web service can provide different sets of user interface elements based on different paths or parameters in the web service URL. For instance, the URL, https://api.example.com, can return the following JSON as the index page:

```
{
"metadata": {
  "version": "1"
},
"content": [
  {
    "elementType": "detail",
    "title": "This is the index page",
    "content": [ ]
  }
]
}
```

To create a different page, the web service can return different user interface elements when a path or query parameter is appended to the base URL. The XModule will then render the returned data from the web service as a separate page. For example, the URL, https://api.example.com/path?param=newpage, can return the following JSON instead of an index page:

```
{
"metadata": {
  "version": "1"
},
"content": [
  {
    "elementType": "detail",
    "title": "This is a different page",
    "content": [ ]
  }
]
}
```

To configure the XModule to enable navigation from one page to another, the web service can return a link item in the first page that sets the relative path for the next page.

For example, the index page of the module, returned by https://api.example.com, can have the following elements:

```
{
"metadata": {
  "version": "1"
},
"content": [
  {
    "elementType": "detail",
    "title": "This is the index page",
    "content": [
      {
        "elementType": "list",
        "grouped": true,
```

```
            "items": [
               {
                  "title": "A link to another page",
                  "link": {
                     "relativePath":
                     "/path?p=new"
                  }
               }
            ]
         }
      ]
   }
]
}
```

When a user interacts with the link item in an application user interface, the) (Module automatically appends the relativePath value to the base URL, in this case creating https://api.example.com/path?p=new. When the XModule makes a request to this URL, the web service returns a different page.

In another implementation, an XModule provides the capability to perform redirects to pages that are internal or external to the platform providing the XModule. Because the redirect itself (HTTP 302 status code) does not have a user interface component, the root "content" field is not required in the JSON response from the web service. Instead, the service returns the root "metadata" field, containing a "redirectLink" object, such as in the following example JSON code:

```
{
   "metadata": {
      "version": "1",
      "redirectLink":
      {
         "external": "http://www.example.com"
      }
   }
}
```

While the above example uses a static link, the web service can instead return a dynamic link based on the user data that XModule provides to the web service via, for example, a JWT token (further described below). For instance, a user ID value can be used to construct and return a link that is specific to the user (e.g., a link to the user's account information in an external system). Deep linking into external sites is advantageous when both sites are behind the same single sign-on ("SSO"), such that there is no need to sign in a second time. When an external site is not behind an SSO, a login token can be constructed to append to the redirect link's URL, although this is dependent on the external site's capabilities.

As described above, XModules can render form elements and provide form submission functionality. Data entered into a form rendered by an XModule can be submitted to a web service URL associated with the XModule or some other URL. In one implementation, to support form submissions, the web service implements the following sequence of HTTP-based API requests and responses:

| Step | Request Method | Sample URL | Response |
|------|----------------|------------|----------|
| 1 | GET | /form | The form. |
| 2 | POST | /form | A redirect to the form receipt. |
| 3 | GET | /receipt | The receipt. |

In Step 1, the web service returns a "form" element containing one or more form input elements as well as a submit button. The form element specifies a "postRelativePath"; this field instructs the XModule to which URL it should POST the user's submitted values. Assuming the web service's base URL is https://api.example.com/form, an example GET form from the web service results in the following:

```
{
   "metadata": {
      "version": "1"
   "content": [
      {
         "elementType": "form",
         "postRelativePath": "",
         "items": [
            {
               "elementType": "input",
               "inputType": "text",
               "name": "user_name",
               "label": "Please enter your name",
               "required": true
            },
            {
               "elementType": "buttonContainer",
               "buttons": [
                  {
                  "elementType": "formButton",
                  "title": "Submit",
                  "buttonType": "submit"
                  }
               ]
            }
         ]
      }
   ]
}
```

In Step 2, when the form is submitted, the XModule uses the "postRelativePath" of the form to determine the URL to which the XModule will POST the user's submitted values. In this example, the "postRelativePath" is an empty string, so the) (Module uses the same base URL (https://api.example.com/form) to POST the values. If, for instance, the user submits their name as John Smith, then the XModule makes the following request to the web service.

POST/form HTTP/1.1
Host: api.example.com
Authorization: Bearer <token>
user_name=John%20Smith The web service processes the submitted values and responds to the XModule with a "redirectLink", as described above. The redirect is used to prevent duplicate POSTs in the event that users browse backward after submission. Assume, for example, that the above POST request results in the web service returning the following:

```
{
   "metadata": {
      "version":"1",
      "redirectLink": {
         "relativePath":
         "./form_receipt?transaction_id=Sm9obiUyMFNtaXRo"
      }
   }
}
```

The redirectLink in this response instructs the XModule to make a subsequent GET request to https://api.example.com/ form_receipt?transaction_id=Sm9obiUyMFNtaXRo, which will return the final page's content in the sequence. Note that this example includes a transaction_id parameter as a means for looking up the receipt values in Step 3; however, the need for a transaction id can depend upon the implementation.

For Step 3, the receipt page returns the content that should be displayed to the user following the form submission. In some cases, this is an updated version of the original form, in which case the redirect can instruct the XModule to return to the web service's base URL instead of a distinct receipt page. For example, assume the web service's receipt is located at https://api.example.com/form_receipt?transaction_id=Sm9obiUyMFNtaXRo In this scenario the web service uses the transaction_id to look up the receipt values (again, the need for this parameter may depend upon the implementation), and then returns the following content:

```
{
  "metadata": {
    "version":"1",
  }
  "content": [
    {
      "elementType": "html", "html":
      "Hello John Smith!"
    }
  ]
}
```

In some implementations, an authentication technique is used to form a trusted relationship between an XModule and its associated web service. In one example, JWTs are used for such authentication. JWT, defined in RFC 7519, can be used to create access tokens that an XModule sends in an HTTP header with each request to the web service. The web service can then use JWT in order to verify that these requests are from a trusted party. The trusted relationship between the XModule and the web service can be established via a shared secret or public/private keys, for example.

A JWT token includes three components: (1) header, (2) payload, and (3) signature. The header contains an "alg" attribute, which refers to the algorithm used to create the token's signature. Its value will be, for example, "HS256" when using a shared secret or "R5256" when using public/private keys. The web service can verify that the "alg" matches the type that the associated XModule has been configured to send. The payload contains an "exp" attribute that indicates an expiration time, which the web service can use to determine whether the token is still valid. The payload also contains an "iat" (issued at time) attribute, which can be used to implement alternative policies if desired. Other information may also be provided in the payload, such as a username and information about the end user's device. For example, in one implementation, an XModule can provide a logged-in user's ID to the web service via the JWT token's "sub" (subject) field. This enables the web service to look up and return user-specific content. To prevent unauthorized parties from accessing this content, the web service can verify that the JWT token's signature is valid and has not expired. When the token is constructed, the header and payload are Base64 URL encoded and then concatenated into a single string using a dot-separated structure. The signature is generated from this initial string and then is itself Base64 URL encoded and appended to the string as well.

As noted above, various types of information can be included in the payload of the JWT token (or provides to the web services via other techniques). For example, the token can be user to transfer metadata about a user (e.g., a user id and other user attributes), the user's device (e.g., the platform/OS), and the interface module itself (e.g., the context in which the module's content is being displayed). The metadata can include context information, such as context associated with where the user has navigated to within a user application or a user's persona or role (e.g., in the case of a front-end application for a college, the user's role may be "student", "faculty", or other educational-based role).

In one implementation, an XModule can return any of the below attributes specific to the user or the user's device. These attributes can be used to create specific content and experiences depending on different information about the user and/or their device. For instance, it may be desirable to layout content differently for large versus small screens.

| Attribute | Description | Possible values |
|---|---|---|
| "pagetype" | Refers to the size of the device. Desktop/tablet devices are generally categorized as "large", while most smartphones are "small". There is also a legacy "text" type that is returned for feature phones and other older devices; for these cases it is typically safe to return the same content that is returned to "small". | "large", "small", "text" |
| "platform" | Used to delineate between requests from iOS, Android, and other sources (including monitoring tools and site crawlers). | "computer", "ios", "ios6", "android", "winphone8", "monitor", "spider", "unknown" |
| "browser" | Refers to the browser-type that is displaying the XModule content. The "native" value will be returned when a user is viewing content from a native app rather than a traditional browser. | "native", "chrome", "safari", "firefox", "ie", "editpreview", "unknown" |
| "environment" | Refers to the server-side environment that the user's device is accessing. Can be used to facilitate debugging by returning different error messages in non-production vs. "production" environments. | "test", "edit", "production", "dev" |
| "persona" | Refers to the persona that the user is accessing in the application supporting the XModules | Returns the persona identifer. |

| Attribute | Description | Possible values |
|---|---|---|
| "persona_timezone_name" | Refers to the persona's time zone. | Returns time zone data values (e.g., "America/New_York"). |
| "persona_timezone_offset" | Refers to the persona's time zone. | Returns time zone offset in seconds. |

In one implementation, XModule supports the use of Asynchronous JavaScript and XML ("AJAX") to alleviate performance costs when fetching certain content, for example, when looking up user-specific content or retrieving content from multiple sources to display in a single screen. XModule can use AJAX for asynchronous loading of certain fields within user interface elements. For instance, the list user interface element can support AJAX loading for the "items" field, and the portlet user interface element can support AJAX loading for the "content" field. Where AJAX loading is used, the content that would normally be returned within an AJAX-supported field is substituted with a JSON object containing an "ajaxRelativePath" field of type "string." The path is appended to the base URL of the web service, and causes the XModule to retrieve a subset of the page's content from a different URL via a separate AJAX request to the web service. Instead of returning the AJAX-retrieved content in a root "content" field, the web service returns the content in a "regionContent" of type "array", representing the content of a specific region of the page.

One example of the foregoing is as follows, in which the Base URL is https://api.example.com/list/ and the AJAX URL is https://api.example.com/list/items/. In this example, the XModule initially makes a request to the external web service using the base URL, which returns the page content.

```
{
"metadata": }
  "version": "1"
},
"content": [
  {
    "elementType": "list",
    "grouped": true,
    "heading": "Example heading",
    "items": }
      "ajaxRelativePath": "items/"
    }
  }
]
}
```

Because "items" returns an object containing an "ajaxRelativePath" (instead of the actual items), the XModule makes a subsequent AJAX request to the web service by using the AJAX URL. The service then returns the "items" content in a root "regionContent" field, as shown below.

```
{
"metadata": }
  "version": "1"
},
"regionContent": [
  {
    "label": "Example label",
    "title": "Example title",
    "description": "Example description"
  },
  {
    "title": "Example title with link",
    "link": {
      "relativePath": "?page=example link",
      "accessoryIcon": "plus"
    },
    "thumbnail": {
      "url": "http://static.modolabs.com/services/modo-.png",
      "maxWidth": 43,
      "maxHeight": 43,
      "crop": true,
      "alt": "Modo Labs"
    }
  }
]
}
```

In one implementation, when an end user accesses this page, they will experience an initial page load that includes a temporary loading spinner until the AJAX content is retrieved and displayed.

An AJAX example using the portlet element will now be described. For this example, the base URL is https://api.example.com/portlet/, and it returns the following JSON:

```
{
"metadata":
  "version": "1"
},
"content": [
  {
    "elementType": "portlet",
    "navbarTitle": "Portlet Title",
    "navbarIcon": "fullweb",
    "navbarLink": {
      "external": "http://www.google.com",
      "accessoryIcon": "external"
    },
    "content": {
      "ajaxRelativePath": "content/"
    }
  }
]
}
```

In this case the "ajaxRelativePath" is used to construct the URL, https://api.example.com/portlet/content/, which returns the following:

```
{
"metadata": {
  "version": "1"
},
"regionContent": [
  {
    "elementType": "html",
    "html": "Hi there!"
  }
]
}
```

Again, in some instances, when the end user first loads the screen, they will see a loading spinner before the AJAX content is loaded.

In one implementation, a user interface of a platform application can include various user interface components that are configured manually or generated in some other manner. Further, the user interface can include components that contain one or more dynamic user interface modules that provide XModule-based content. Such modules, referred to herein as XComponents, allow for specific subsets of XModule elements to be incorporated as individual features in an existing platform application. For example, XComponents can be included in Mondrian, collage, and card navigation (e.g., card carousel) user interface templates. Such XComponents can represent tiles, cards, blocks, and similar user interface components, as well as carousel versions of the same. XComponents can also be used in portlets and added to the header and/or footer areas of screens in other modules. A JSON response from a web service can be used to populate the elements of XComponent content, as described above with respect to XModules.

In some implementations, XComponents can be used within the header or footer section of a user interface module of an application platform, such as that described herein. Similar to collage blocks, header/footer XComponents are containers for supported) (Module elements. In one instance, a header or footer supports a single XModule element in the root "content" array, although multiple elements can be supported in other implementations. Supported elements in XComponent headers and footers can include lists, images, portlets, and HTML declarations, among others.

In further implementations, XModules are used to facilitate other aspects of the user experience where XModule itself may or may not perform any rendering of user interfaces. For example, the "external" link type and "redirectLink" object described above can be used to facilitate dynamically generated deep links into third party sites and applications, rather than specify an internal link within a platform application or other XModule. XModules can also be used to facilitate access to or invocation of capabilities of the underlying operating system, for instance, sensor data (e.g., geolocation, accelerometer, etc.), or other applications that expose capabilities through the operating system (e.g., payment applications such as Apple® Wallet). In such instances, metadata can be delivered to/from the web service, or mechanisms for the web service can be used to invoke, via an XModule, user interfaces generated by third party software.

Middleware Architecture and Framework

Referring back to FIG. 2, the middleware application executing on the middleware application server 222 is limited to the integration of one front-end application 202 with one instance of the back-end data source 204. However, many front-end applications share the same type of back-end data source and would benefit from the same integration. To avoid the need to deploy multiple instances of the same middleware application to different middleware application servers in order to service different customers, a software-as-a-service ("SaaS") scheme can be used for providing middleware applications. One instance of such a SaaS-based middleware application is able to service one or more front-end applications while communicating on the back-end with one or more instances of a particular type of data source. In a sense, the middleware application becomes a turn-key service, where a configuration may optionally be used in order to facilitate connection of the middleware between a front-end application and back-end data source.

Advantageously, this approach addresses numerous challenges that occur over the software development lifecycle and reduces the resources that need to be maintained, reduces duplicate code across middleware applications, enables developers to deploy code changes at once to all customers that are using the middleware application, eliminates "drift" that may occur when separate instances of the middleware are deployed for each customer (driven by varying customer needs), and establishes a variety of schemes and conventions enabling faster development of wholly new middleware applications.

Figure 6:
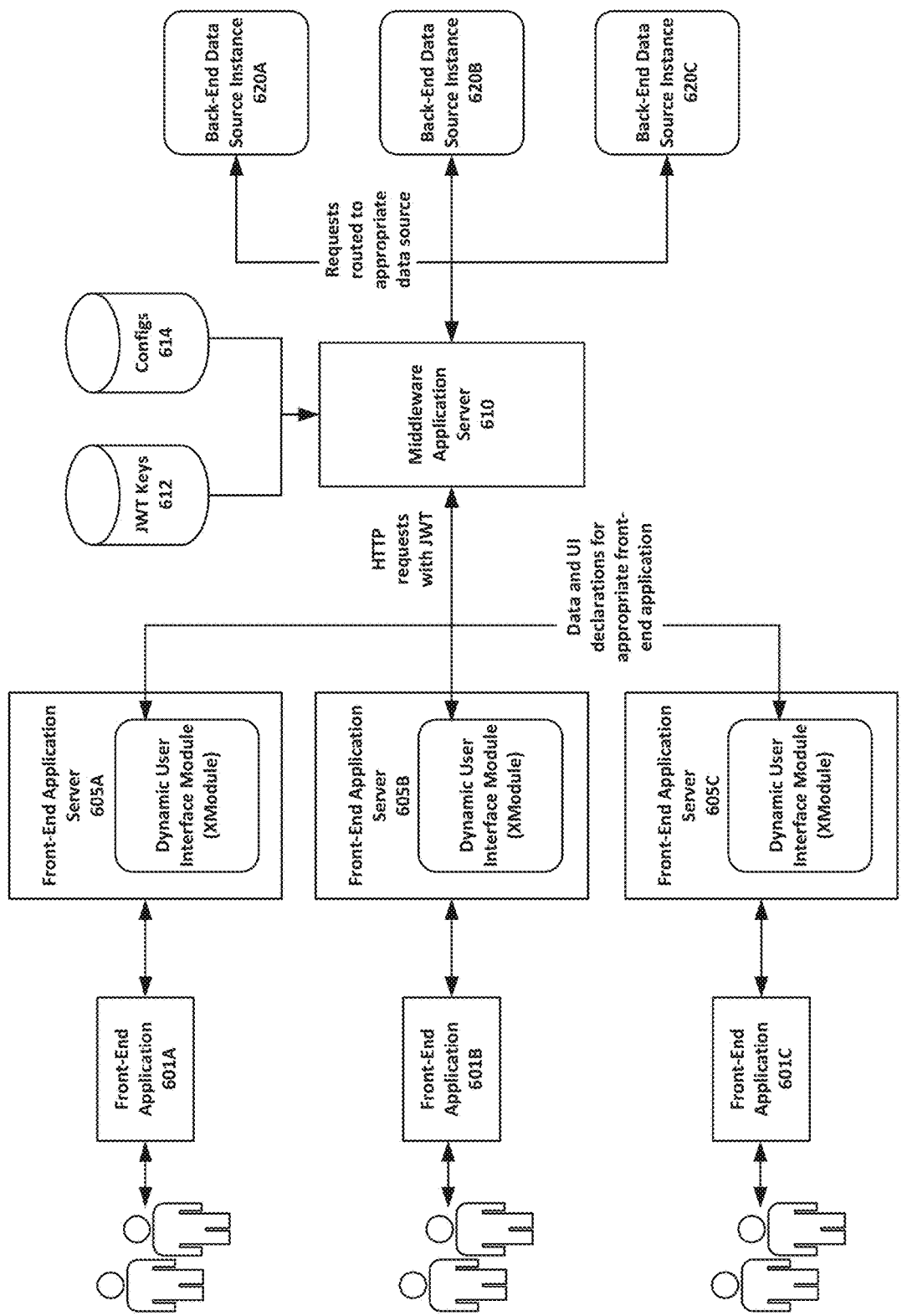
FIG. 6 depicts a high-level architecture of a system for providing dynamic user interface modules via a single middleware application for multiple data source instances.

FIG. 6 depicts one implementation of the SaaS-based middleware system described above. As shown, connections made between the front-end (i.e., front end applications 601A-C and front-end application servers 605A-C) and the back-end (i.e., back-end data source instances 620A-C) flow through a single instance of a middleware application on middleware application server 610. The middleware application supports at least one type of back-end data source (e.g., Oracle PeopleSoft®, Microsoft Office 365®, Google Workspace™, etc.) and is able to communicate with multiple instances of a supported external data source (here, back-end data source instances 620A-C). In addition, the middleware application server 610 no longer contains a single JWT key or back-end configuration, but, instead, dynamically retrieves them from an external resource, such as a database (here, JWT Keys 612 and Configs 614, respectively) depending on which front-end application 601A, 601B, or 601C is accessing the middleware application server 610. As such, the system is able to authenticate requests from different front-end applications and dynamically retrieve the appropriate configuration (including configuration data that instructs the middleware application how to communicate with a specific back-end data source) for use with the front-end application making the request. In one implementation, the JWT Keys 612 database is populated with public keys at the time they are created. For example, when a front-end application is created or registered with the system, a public key and private key pair can be generated, and the public key for the front-end application is sent to the system for storage in JWT Keys 612. Shared secrets can also be used instead of or in addition to public and private key pairs. In some implementations, the configuration data retrieved from Configs 614 also includes front-end configuration data, such as a different feature set to be communicated by the middleware application server 610 to the relevant front-end application server 605A, 605B, or 605C. For purposes of simplifying illustration, FIG. 6 depicts only three front-end to back-end connections; however, it is to be appreciated that there may be any number of front-end applications and back-end data source instances in communication with middleware application server 610.

Figure 7:
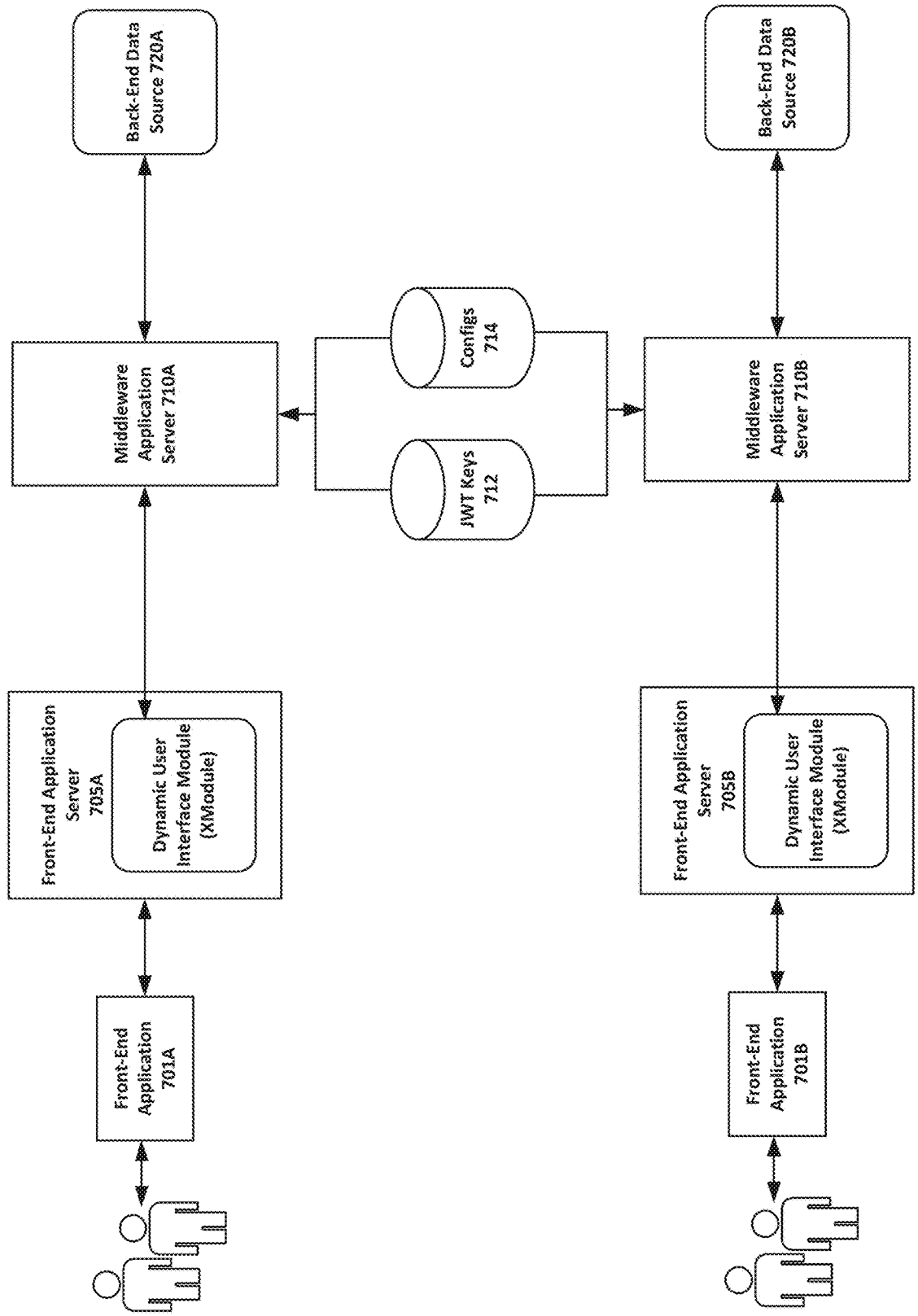
FIG. 7 depicts a high-level architecture of a system for providing dynamic user interface modules that includes authentication and configuration data shared among multiple middleware applications.

In another implementation, the framework described with respect to FIG. 6 can be leveraged by multiple middleware applications, as illustrated in FIG. 7. Instead of different instances of the same type of back-end data source (see back-end data source instances 620A-C in FIG. 6), FIG. 7 depicts different types of back-end data sources 720A and 720B in respective communication with middleware application servers 710A and 710B, each of which is constructed to support communication with the particular back-end data source 720A or 720B. The middleware application servers 710A and 710B respectively communicate with front-end application servers 705A and 705B to support dynamic user interface updates in their associated front end-applications 701A and 701B. Middleware applications servers 710A and 710B share the external resources storing JWT Keys 712 and configuration data 714. FIG. 7 is simplified for purposes of illustration, and one of skill in the art will appreciate that a particular middleware application server 710A or 710B can be in communication with more than one instance of a back-end data source in order to support different front-end applications. In other words, the concepts depicted in FIG. 6 and FIG. 7 can be combined for more complex systems. In further implementations, a particular middleware application can be constructed to support communication with not only different instances of one type of a back-end data source, but also different instances of different types of back-end data sources.

The SaaS-based integration models shown FIGS. 6 and 7 incorporate a middleware framework for securing requests from a front-end application and selecting the appropriate configuration to use for connecting with a back-end data source. Authentication can be implemented via JWT tokens included with HTTP(S) requests from dynamic user interface modules. In one implementation, each front-end application has its own private key that the dynamic user interface module in connection with such front-end application uses to sign the JWTs. The middleware application can dynamically fetch the public key corresponding to the private key based on an identifier associated with the front-end application and contained in the JWT's payload. The identifier can be, for example, an identifier unique to the front-end application and specified in an "app_id" field in the JWT's payload. The public keys are decoupled from the middleware application into a separate resource, such as JWT Keys 612 or 712. Such resource can be a database or any other suitable store or access method, such as a URL scheme, to which the middleware application can interface. The middleware application then uses the public key to verify that the JWT token is valid and from a trusted source. In other implementations, a shared secret is used instead of public and private key pairs. The shared secret is known to the front-end application and is used to sign the JWTs, and the middleware application can retrieve the shared secret from an external resource based on an identifier associated with the front-end application and contained in the JWT's payload.

The middleware framework similarly decouples the back-end configuration data from the middleware application into a separate resource, such as Configs 614 or 714. Such resource can be a database or any other suitable store or access method, such as a URL scheme, to which the middleware application can interface. The following is an example of a configuration that may be stored in this resource, where the data itself is in JSON format and would be used with a back-end service.

```
[
  {
    "allowedApps": [
      "customer_one_app"
    ],
    "appIdInstanceId":       "backendservice:customer-
      _one_config",
    "createdAt": 1589386450,
    "item": {
      "user": "john smith",
      "password": "12345",
      "back_end_url": "https://backendservice.com/api/"
    }
  }
]
```

In some implementations, to allow different middleware applications to retrieve configurations from an external resource, each configuration includes an identifier for its corresponding middleware application. In the above JSON example, this identifier is stored in the first segment of the "appIdInstanceId" field ("backendservice"), and the latter section of the field is the identifier for the configuration itself ("customer_one_config"). To retrieve the appropriate configuration for a given request to the middleware application, the configuration identifier can be included with the request. In one option, the "app_id" from the JWT is used as the configuration identifier, which also enables the middleware application to trust that the configuration should only be used for that front-end application. Another option, which enables certain configurations to be re-used by multiple front-applications, is to include a separate configuration identifier in the request URL to the middleware application. For instance, if the URL to the middleware is "https://www.example.com/", then the identifier can be appended as a parameter after the domain: "https://example.com/<config_id>". If this were the URL pointing to the middleware application used with the back-end service, the URLs can look as follows for two separate customers, where the added parameter is the configuration id.

(1) https://example.com/customer_one_config
(2) https://example.com/customer_two_config The first URL would cause the middleware to use the example configuration data above because it would match the "appIdInstanceId": "backendservice:customer_one_config" identifiers, whereas the second URL would cause the middleware to look up a different configuration. To prevent someone from using a configuration with the wrong front-end application, the configuration can contain a whitelist of allowed applications. This is expressed in the example JSON data via the "allowedApps" field.

The "item" field in the example JSON data contains the configurations for the customer_one_config (note the "item" name is used for purposes of illustration and has no specific meaning in and of itself). In this case, "item" contains service account credentials and a URL to the external APIs of the back-end service. For different customers using the middleware application that integrates with the back-end service, there can be different configurations with these same fields. Different middleware applications can have their own distinct sets of configurations in the "item" field. Configuration identifiers can be reused between middleware applications, with the configuration identifier being separate from the unique identifier associated with each front-end application (e.g., the distinct identifier as declared in the first segment of the "appIdInstanceId.") For example, an "appIdInstanceId" of "office365:customer_one_config" would return a different JSON configuration than "backendservice: customer_one_config."

Note that the example JSON configuration provided only includes back-end configurations. However, in some implementations, when the middleware application is servicing the dynamic user interface module, it also includes (or only includes) front-end configurations. Such front-end configurations can include, for example, options to override text strings displayed in the user interface, different user interface layouts, and different user experiences.

As earlier described, in the implementations depicted in FIGS. 6 and 7, the configuration data for a middleware application is not embedded within it. To enforce consistency between the different configurations that may be available for a particular middleware application (e.g., customer_one_config and customer_two_config, which both work with the same middleware application), a schema can be implemented for middleware application configuration data. In one implementation, the schema defines the naming, data types, and structure of the configuration requirements and options for a middleware application. Each schema field can have a name and type (e.g., Boolean, integer, string, list, etc.). There can be a different schema for each middleware application, or in some instances, different middleware applications can use the same schema.

Figure 8:
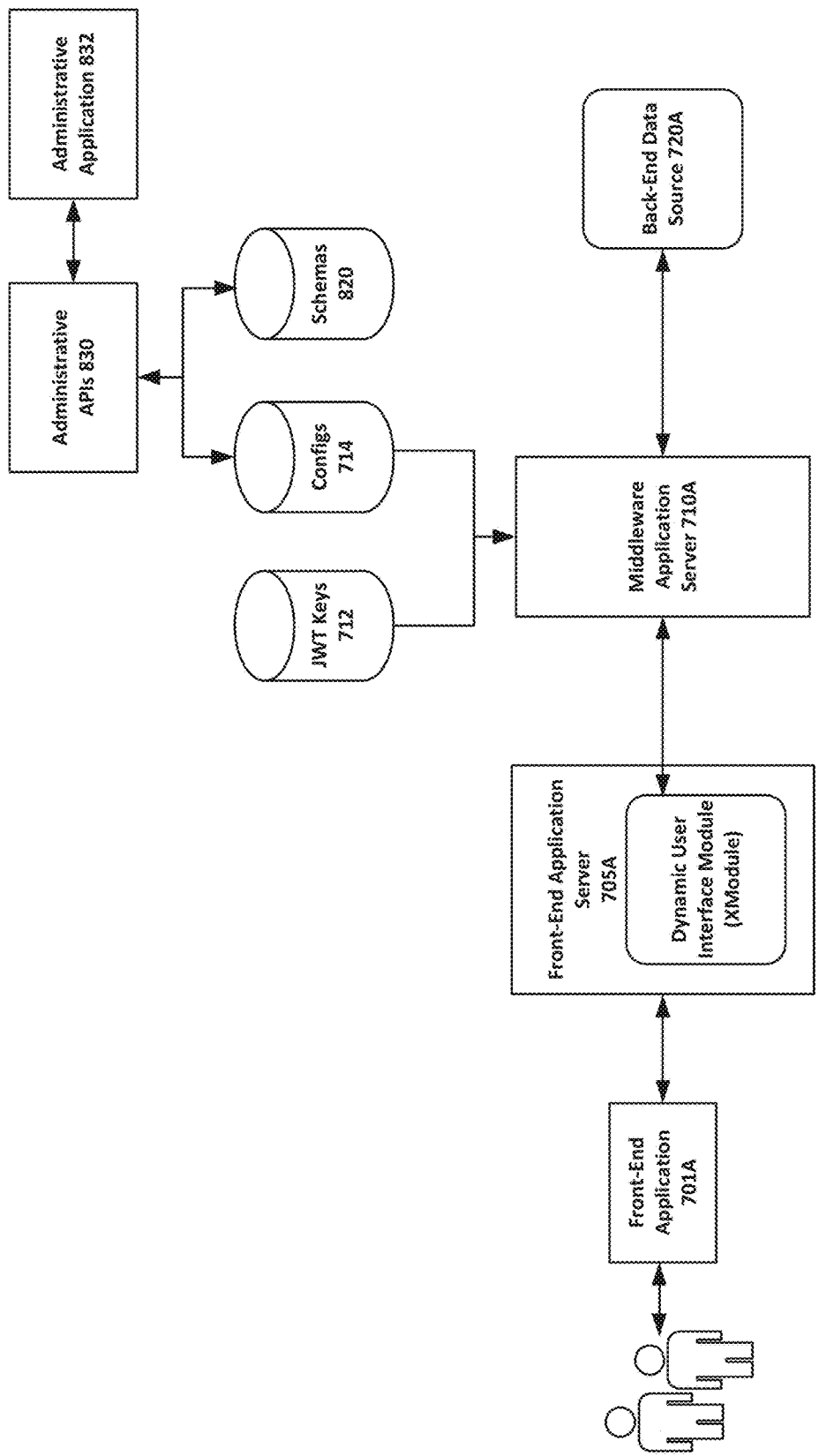
FIG. 8 depicts a high-level architecture of a system for providing dynamic user interface modules that includes an administrative application and schemas.

Referring now to FIG. 8, the aforementioned schemas can be stored in external resource Schema 820, which can be, for example, a database or any other suitable store or access method, such as a URL scheme accessible to a middleware application. In some implementations, to enable administrators to create and/or edit schemas and middleware application configurations, administrative APIs 830 and an administrative application 832 are provided. To write a configuration (whether created or updated with the administrative application 832) to the Configs store 714, the administrative APIs 830 first verify that the configuration complies with the applicable schema and reject the configuration if it does not. This system provides additional accommodations to facilitate development of the middleware applications, including libraries for handling common code in the middleware framework (e.g., the JWT verification and configuration handling) and schemes for organizing middleware application code (particularly those written for the dynamic user interface module). Such schemes can include naming schemes to distinguish logs generated by the middleware that are associated with different customers (specifically, with their different configurations), and naming schemes for other supporting resources that may be used by the middleware and are distinct between customer configurations (e.g., cache keys, databases). The system also features separation of environments for development, testing, and production purposes, and deployment of middleware application code into these environments.

It should be appreciated that the middleware framework described herein can be adapted to other use cases, including use cases in which the middleware application does not send or receive data relating to user interface components. In one instance, in an extract, transform, load (ETL)-type integration, the middleware application exists between two back-end systems. In this scenario, the middleware application can fetch or receive data from a back-end data source and can transform the data in a manner that allows the transformed data to be stored in a different back-end system. Another implementation includes a multi-middleware scenario, in which one middleware application can merge data from one or more other middleware applications. For example, this implementation can be used to integrate features from an office suite backend service API and a video-conferencing backend service API into a single experience. In this scenario, one middleware application may fetch certain data from another middleware application, but only the first middleware application responds to an XModule with user interface declarations. In yet another implementation, the middleware framework can be used with a "connector"-type approach in which the front-end application has a pre-defined user interface and knows how to map raw middleware data into the user interface components.

Middleware Application Development

One implementation of how a middleware application as described herein can be developed will now be described. Using the middleware framework described above, the middleware application provides seamless integration between a back-end data source and an) (Module without requiring the middleware to be tied to a particular customer's configuration. Instead, middleware configurations relating, for example, to a data source and/or front end can be stored in a separate resource and retrieved by the middleware application as needed. The middleware application can provide this functionality via a stack that incorporates Node.js® and Express.js provided by the OpenJS Foundation, the Serverless framework provided by Serverless, Inc., AWS Lambda provided by Amazon.com, and an optional use-case-based storage component. Node.js/Express.js serves as the handler for programmer-defined endpoints that the front-end application and front-end application server can access in order to retrieve and serve data. The Serverless framework is used to deploy and manage AWS Lambda functions.

Figure 9:
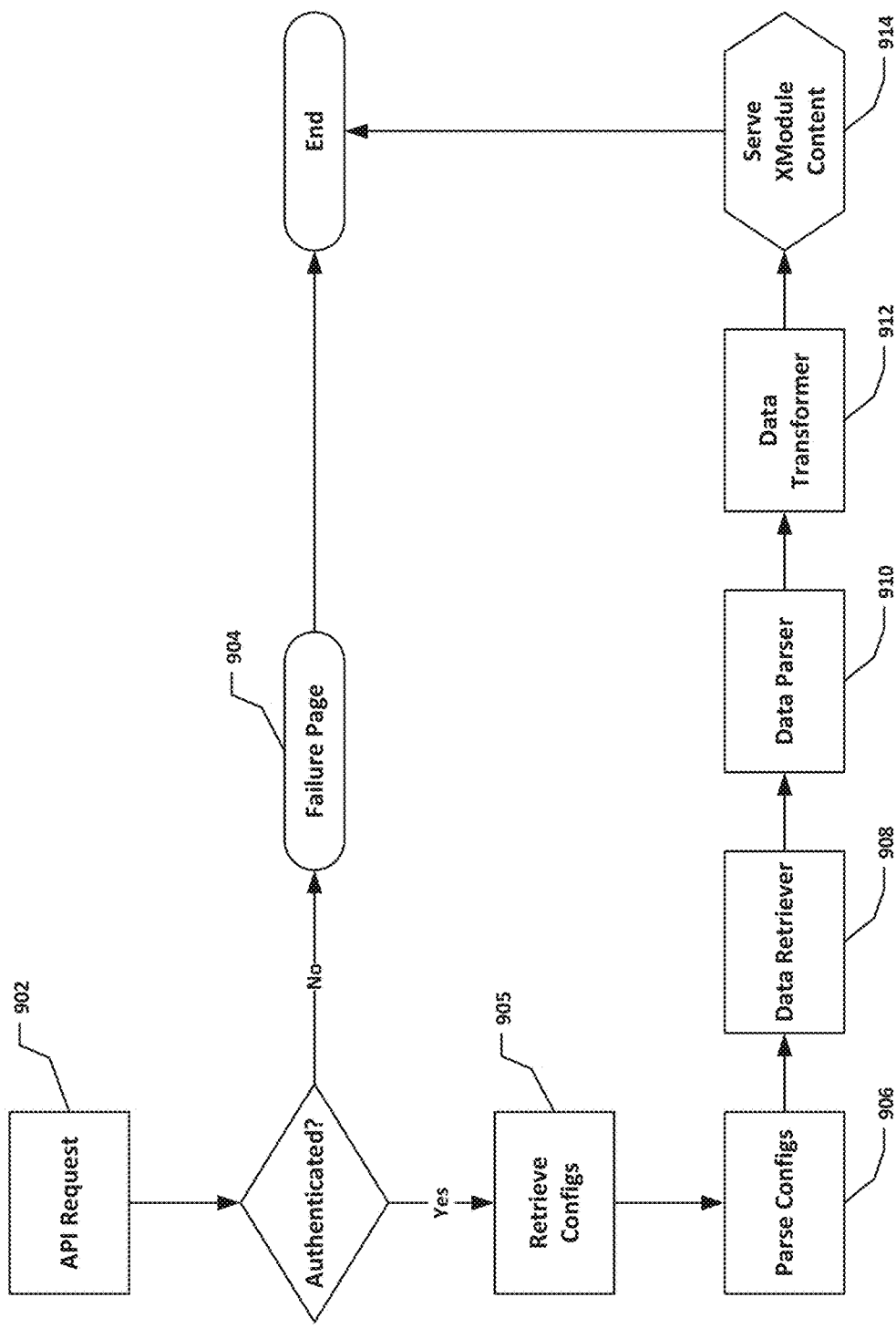
FIG. 9 depicts an example flow of a middleware application according to an implementation.

FIG. 9 depicts an example general flow of the middleware application. The middleware application can incorporate functions that relate to authentication, retrieving configurations, retrieving data from a vendor, handling API incoming requests, and processing/transforming data into XModule content. A main handler routes incoming API requests 902 and delegates tasks to a controller, which delegates to all other functions. The request fails 904 if it cannot be authenticated. Otherwise, following authentication of the request, the middleware framework retrieves the configurations 905, if any, for customer-level application configurations defined in the schema. The controller parses the configurations 906 and calls a data retriever 908, which retrieves data from a back-end data source in accordance with the configurations. Processing (e.g., filtering and other data operations) of the retrieved data is handled by a data parser 910, following which the processed data is transformed into) (Module content by a data transformer 912. The resulting XModule content is served 914 to the requesting application.

The middleware application can include various modules, including those described above. In one implementation, the modules are Node.js modules. In one instance, a controller module delegates tasks to other modules. A middleware application can include multiple controller modules, each configured to delegate tasks to different modules based on different types of incoming API requests. Modules relating to data can include a data retriever, data parser and data storage modules. Data retriever modules interact with external APIs and return data. Data parser modules filter the data returned from the data retriever modules. Data storage modules provide mechanisms for caching and storing static assets and other data. Such mechanisms can include, for example, remote storage services and databases. Transformer modules can convert processed data into XModule renderable pages or into data formats for non-(Module systems. Template files specifying XModule elements can be used by the transformer modules to generate the pages. Each XModule page can have its own associated transformer module. Further modules in a middleware application can include utility functions, such as logging and error handling.

Development Lifecycle

In various implementations, different lifecycle stages of the code of a middleware application code are separately hosted. For example, these stages can be separated into different environments associated with development, testing, and production. Each environment is implemented by setting up distinct versions of the middleware framework's resources (for example, the JWT Keys and Configs resources) in that environment. For instance, a developer may set up a local version of the resources on their computer in order to test middleware application code they are actively writing. Distinct sets of these resources may also be provisioned into different accounts (e.g., Amazon AWS™ accounts) in order to separate the production environment from testing. In order to deploy the middleware code to the hosted environments, a continuous integration system can be used to initiate code deployments as merge commits are made in a code repository.

Figure 10:
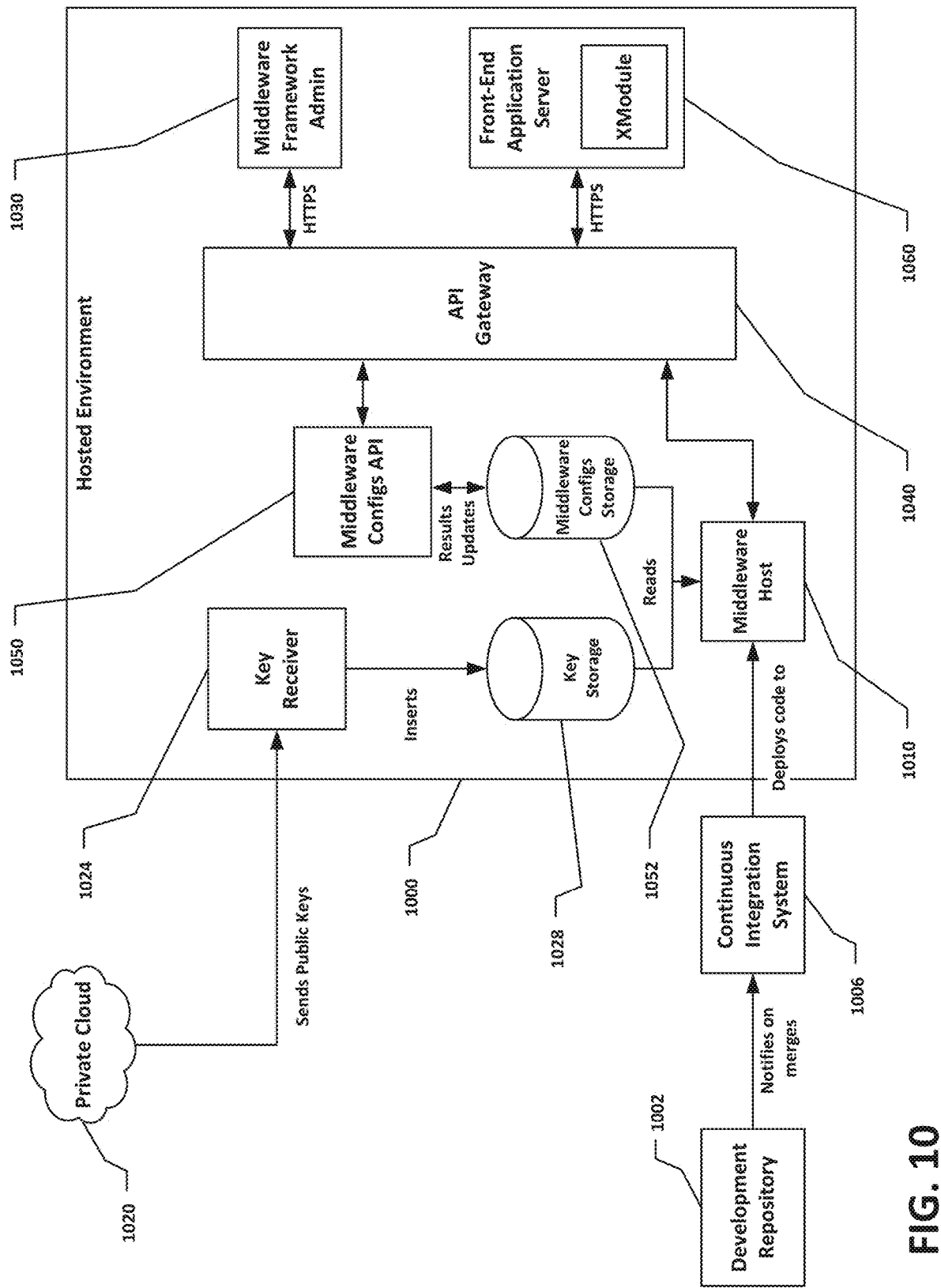
FIG. 10 depicts a high-level diagram of the components and services used to implement and deploy to a hosted version of the middleware framework, according to an implementation.

FIG. 10 illustrates one implementation of the components and services used to implement and deploy to a hosted version of the middleware framework. One will appreciate that the components and services depicted are exemplary, and components and services providing similar functionality can be substituted. For example, while one hosted environment 1000 is depicted, certain branching schemes can be implemented together with the continuous integration system 1006 to deploy changes in the repository to multiple hosted environments. For instance, a "develop" and "master" branching scheme based on Git Flow can be used.

Middleware application software is maintained in a development repository 1002 (e.g., GitHub). Upon merging or releasing a version of the application software, a continuous integration system 1004 (such as CircleCI, provided by Circle Internet Services, Inc.) is notified. The continuous integration system 1006 deploys the middleware application software to a middleware host 1010 within the hosted environment 1000. In one implementation, the hosted environment 1000 is Amazon Web Services (AWS) and the middleware host 1010 is the AWS Lambda serverless computing platform. In another implementation, the middleware host 1010 is a traditional server.

Public keys (e.g., JWT public keys referred to above) are pushed from private cloud 1020 to key receiver 1024 in hosted environment 1000. To facilitate the receipt of keys, hosted environment 100 can include a publish/subscribe notification service, such as AWS Simple Notification Service, that informs key receiver 1024 when public keys are published by private cloud 1020. On receiving a public key, key receiver 1024 inserts the key into key storage 1028. Key storage can be, for example, a database service such as Amazon DynamoDB.

Middleware framework administration 1030 includes administrative APIs 830 and administrative application 832 as described above with respect to FIG. 8. Middleware framework administration 1030, which is an administrative interface for middleware configuration data, connects to middleware configs API 1050 through API gateway 1040. Middleware configs API 1050 is used to store, update and retrieve middleware configurations in and to middleware configs storage 1052 (e.g., a database service such as Amazon DynamoDB). API gateway 1040 can be, for example, a web server sitting in front of the server platform (e.g., AWS Lambda) that communicates over HTTP(S).

From the end user's perspective, front end application server 1060 communicates with middleware host 1010 through API gateway 1040, as described earlier herein. Middleware host 1010 fetches public keys from key storage 1028 and middleware configuration data from middleware configs storage 1052, in each case as needed.

Figure 11A:
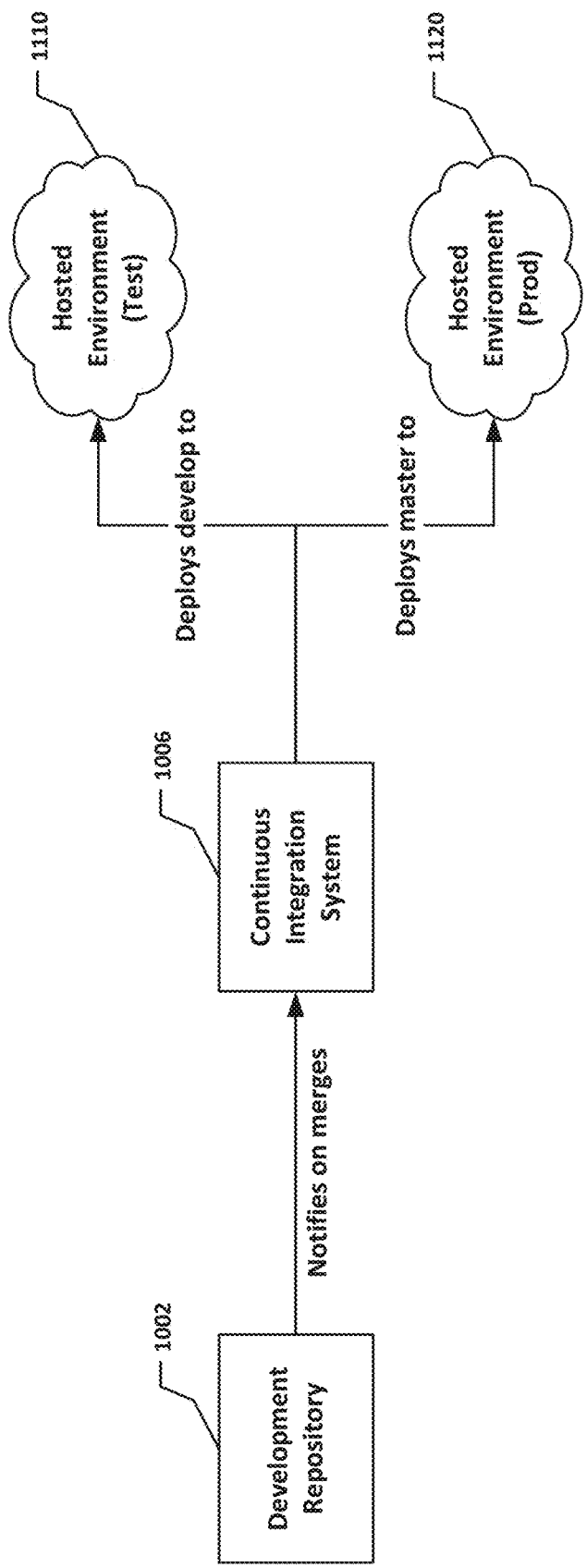
FIGS. 11A and 11B depict example separations of cloud instances for the cloud services of FIG. 10.
Figure 11B:
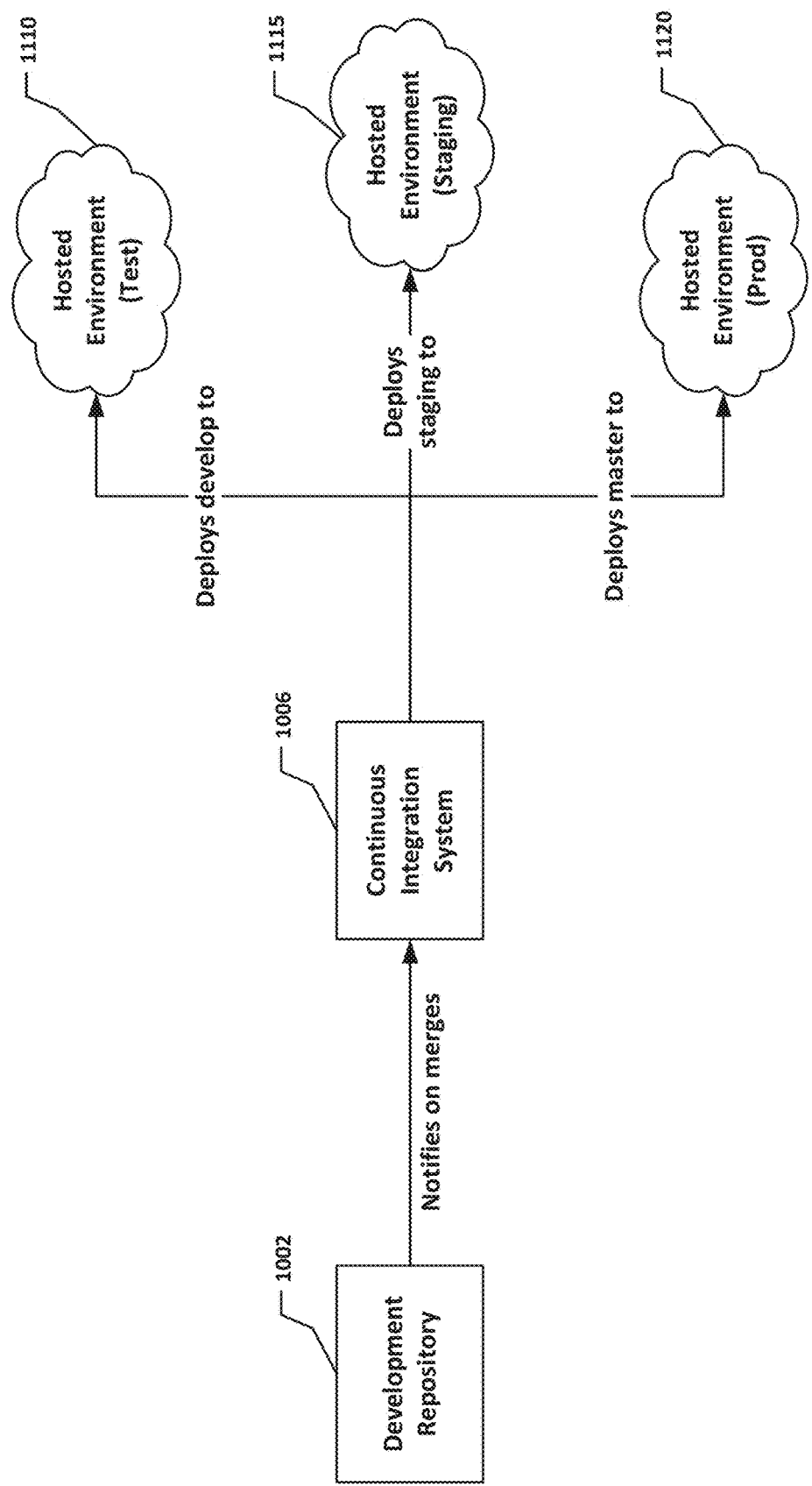

In FIG. 11A, the hosted environment test cloud instance 1110 and hosted environment production cloud instance 1120 represent two distinct sets of the resources in the hosted environment 1000 of FIG. 10. The cloud instances 1110 and 1120 can exist in separate hosted environment accounts to prevent any connections made between the respective resources when in a virtual private cloud. FIG. 11B illustrates a variation of the deployment scheme of FIG. 11A that accommodates a third-party developing integrations with system components (e.g., the dynamic user interface module) using the middleware application framework. In this case, there are three branches—"develop", "staging", and "master"—that each deploy to separate hosted environment accounts. The third-party has the ability to write to the "develop" branch of the code repository and initiate deployments to the hosted environment test cloud instance 1110. Further, the third party is provided access to the hosted environment account containing the hosted environment test cloud instance 1110 to facilitate debugging of the hosted environment. The third party cannot access the hosted environment staging cloud instance 1115 and hosted environment production cloud instance 1120, which are used for quality assurance and production purposes. In another implementation, a third party such as a partner or customer using the system can be granted access to a code repository to write their own middleware application using the middleware framework described herein. In this case, the framework's resources for the testing and production cloud instances 1110 and 1120 can be hosted in an account that the third party can access.

Computer Systems

Components of the systems described herein can utilize appropriate hardware or software and can execute, for example, on a system capable of running a server-class, desktop, or mobile operating system such as the Microsoft Windows® operating systems, the Apple OS X® operating systems, the Apple iOS® platform, the Google Android™ platform, the Linux® operating system and other variants of UNIX® operating systems, and the like. Some or all of the described functionality can be performed remotely, in the cloud, or via software-as-a-service.

The system can include any suitable software and/or hardware, and can include or operate on a smart phone, feature phone, smart watch, smart glasses, tablet computer, portable computer, television, gaming device, music player, mobile telephone, desktop computer, laptop, palmtop, smart or dumb terminal, network computer, personal digital assistant, wireless device, information appliance, workstation, minicomputer, mainframe computer, or other computing device, that is operated as a general purpose computer or a special purpose hardware device that can execute the functionality described herein. The software, for example, can be implemented on a general purpose computing device in the form of a computer including a processing unit, a system memory, and a system bus that couples various system components including the system memory to the processing unit.

The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, a user device includes a web browser, native application, or both, that facilitates execution of the functionality described herein. A web browser allows the device to request a web page or other program, applet, document, or resource with an HTTP request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of a device manually requests a resource from a server. Alternatively, the device automatically makes requests with a browser or native application. Examples of commercially available web browser software include Google Chrome®, Microsoft Internet Explorer®, Mozilla Firefox®, and Apple Safari®.

A communications network can connect devices, back-end systems and servers directly or indirectly with each other. The communication can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are possible. The network can carry TCP/IP protocol communications, and HTTP/HTTPS requests made by a web browser or native application and the connections can be communicated over such TCP/IP networks. Other communication protocols are possible.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B,") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The invention claimed is:

1. A computer-implemented method for providing a middleware application for data-driven applications, the method comprising:
   receiving, at a middleware application, a plurality of queries from a plurality of different front-end applications, wherein each query comprises authentication data, a unique identifier, and a configuration identifier; and
   in response to each query:
      receiving at the middleware application, from an authentication resource external to the middleware application, based on the unique identifier included in the query, verification data;
      authenticating one of the front-end applications associated with the query using the authentication data included in the query and the verification data received from the authentication resource external to the middleware application;
      receiving at the middleware application, from a configuration resource external to the middleware application, based on the configuration identifier included in the query, configuration data that conforms to a schema and is associated with the front-end application that is associated with the query;
      establishing a connection between the middleware application and an external data source using the configuration data received from the configuration resource external to the middleware application, wherein the external data source and the configuration resource comprise different systems or providers;
      receiving, over a network by the middleware application, data from the external data source; and
      sending, by the middleware application to the front-end application, information based on the data.

2. The method of claim 1, wherein the middleware application is configured to connect to a plurality of external data sources, each external data source comprising a separate instance of a same back-end service.

3. The method of claim 1, wherein the authentication data comprises a JavaScript Object Notation Web Token comprising a signature formed using a private key of the front-end application, and wherein the verification data comprises a public key for verifying the signature.

4. The method of claim 1, wherein the configuration data comprises information necessary for the middleware application to communicate with the external data source.

5. The method of claim 1, wherein the schema defines naming, data types and structure for the configuration data at the configuration resource.

6. A computer-implemented method for providing a middleware application for data-interface-driven applications, the method comprising:
   receiving, at a middleware application, a first query associated with a first front-end application, wherein the first query comprises first authentication data, a first unique identifier, and a first configuration identifier, each associated with the first front-end application;
   in response to the first query:
      receiving at the middleware application from an authentication resource external to the middleware application, based on the first unique identifier, first verification data;

authenticating the first front-end application based on the first authentication data and the first verification data;

receiving at the middleware application from a configuration resource external to the middleware application, based on the first configuration identifier, first configuration data corresponding to the first front-end application, wherein the first configuration data comprises information necessary for the middleware application to communicate with a first external data source;

establishing over a network a connection between the middleware application and a first external data source using the first configuration data, wherein the first external data source and the configuration resource comprise different systems or providers; and receiving, by the middleware application, first data from the first external data source;

receiving, at the middleware application, a second query associated with a second front-end application, wherein the second query comprises second authentication data, a second unique identifier and a second configuration identifier, each associated with the second front-end application; and in response to the second query:

receiving at the middleware application from the authentication resource, based on the second unique identifier, second verification data;

authenticating the second front-end application based on the second authentication data and the second verification data;

receiving at the middleware application from the configuration resource, based on the second configuration identifier, second configuration data corresponding to the second front-end application, wherein the second configuration data comprises information necessary for the middleware application to communicate with the second external data source;

establishing over a network a connection between the middleware application and a second external data source using the second configuration data, wherein the first external data source and the second external data source comprise separate instances of a same back-end service; and receiving, by the middleware application, second data from the second external data source.

7. A system for providing a middleware application for data-interface-driven applications, the system comprising:
processor hardware; and
memory hardware storing computer-executable instructions that, when executed by the processor hardware, program the processor hardware to perform the operations of:
receiving, at a middleware application, a plurality of queries from a plurality of different front-end applications, wherein each query comprises authentication data, a unique identifier, and a configuration identifier; and
in response to each query:
receiving at the middleware application, from an authentication resource external to the middleware application, based on the unique identifier included in the query, verification data;
authenticating one of the front-end applications associated with the query using the authentication data included in the query and the verification data received from the authentication resource external to the middleware application;
receiving at the middleware application, from a configuration resource external to the middleware application, based on the configuration identifier included in the query, configuration data that conforms to a schema and is associated with the front-end application that is associated with the query;
establishing a connection between the middleware application and an external data source using the configuration data received from the configuration resource external to the middleware application, wherein the external data source and the configuration resource comprise different systems or providers;
receiving, over a network by the middleware application, data from the external data source; and
sending, by the middleware application to the front-end application, information based on the data.

8. The system of claim 7, wherein the middleware application is configured to connect to a plurality of external data sources, each external data source comprising a separate instance of a same back-end service.

9. The system of claim 7, wherein the authentication data comprises a JavaScript Object Notation Web Token comprising a signature formed using a private key of the front-end application, and wherein the verification data comprises a public key for verifying the signature.

10. The system of claim 7, wherein the configuration data comprises information necessary for the middleware application to communicate with the external data source.

11. The system of claim 7, wherein the schema defines naming, data types and structure for the configuration data at the configuration resource.

* * * * *